(12) United States Patent
Ikeda et al.

(10) Patent No.: US 9,836,115 B2
(45) Date of Patent: \*Dec. 5, 2017

(54) INFORMATION PROCESSING DEVICE, INFORMATION PROCESSING METHOD, AND PROGRAM

(71) Applicant: SONY CORPORATION, Tokyo (JP)

(72) Inventors: Tetsuo Ikeda, Tokyo (JP); Tomohiro Ishii, Tokyo (JP); Atsushi Izumihara, Kanagawa (JP); Takayuki Sakamoto, Kanagawa (JP); Masayuki Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/086,606

(22) Filed: Mar. 31, 2016

(65) Prior Publication Data
US 2016/0209915 A1 Jul. 21, 2016

Related U.S. Application Data

(63) Continuation of application No. 14/490,797, filed on Sep. 19, 2014, now Pat. No. 9,332,117.

(30) Foreign Application Priority Data

Nov. 5, 2013 (JP) .................................. 2013-229360

(51) Int. Cl.
*G09G 5/00* (2006.01)
*G06F 3/00* (2006.01)
(Continued)

(52) U.S. Cl.
CPC .............. *G06F 3/005* (2013.01); *G06F 3/011* (2013.01); *G06F 3/017* (2013.01); *G06F 9/48* (2013.01);
(Continued)

(58) Field of Classification Search
None
See application file for complete search history.

(56) References Cited

U.S. PATENT DOCUMENTS

2012/0059780 A1  3/2012 Kononen et al.

FOREIGN PATENT DOCUMENTS

EP     2418563 A2    2/2012
JP   2006-048672    2/2006
(Continued)

OTHER PUBLICATIONS

Mar. 27, 2015, Extended European Search Report for related EP application No. 14190647.9.
(Continued)

*Primary Examiner* — Adolf Dsouza
(74) *Attorney, Agent, or Firm* — Paratus Law Group, PLLC

(57) ABSTRACT

Provided is an information processing device including a retrieval unit configured to retrieve a data record in which a marker detected in an image acquired by a terminal device is associated with a function of the terminal device, and a calling function determination unit configured to determine the function to be called in the terminal device based on the data record found through the retrieval. The data record includes information generated based on a calling history of the function in which the marker in the terminal device is used.

17 Claims, 26 Drawing Sheets

(51) Int. Cl.
*H04M 1/725* (2006.01)
*H04W 4/16* (2009.01)
*G06F 3/01* (2006.01)
*G06F 9/48* (2006.01)
*G06K 9/00* (2006.01)

(52) U.S. Cl.
CPC .... *G06K 9/00664* (2013.01); *H04M 1/72583* (2013.01); *H04W 4/16* (2013.01); *H04M 2250/52* (2013.01)

(56) References Cited

FOREIGN PATENT DOCUMENTS

| | | |
|---|---|---|
| JP | 2009-110493 | 5/2009 |
| JP | 2012-198668 | 10/2012 |
| JP | 2013-125379 | 6/2013 |
| WO | WO 2009/079407 A2 | 6/2009 |
| WO | WO 2013/088637 A2 | 6/2013 |

OTHER PUBLICATIONS

Dawson, Getting the Most Out of QR Codes Using URI Schemes, SixRevisions.com, Feb. 20, 2012, pp. 1-13.
Oct. 18, 2016, JP communication issued for related JP application No. 2013-229360.

FIG.8A

| # | MARKER | | FUNCTION | REGISTRATION DATE | USE TIME INFORMATION | | | | |
|---|---|---|---|---|---|---|---|---|---|
| | ORIGINAL IMAGE | FEATURE AMOUNT | | | USER | PERIOD OF TIME | POSITION | HAND SIZE | |
| 1 | | | TRAIN OPERATION INFORMATION SITE | 2013/01/01 00:00 | FATHER | MORNING | LEFT | LARGE | ～1080a |
| 2 | | | POINT CARD WEBSITE | 2013/01/01 00:00 | SON | AFTERNOON | LEFT | LARGE | ～1080b |
| 3 | | | FLIER SITE A | 2013/01/01 00:00 | MOTHER | AFTERNOON | BOTTOM | LARGE | ～1080c |
| 4 | | | FLIER SITE B | 2013/01/01 00:00 | MOTHER | AFTERNOON | BOTTOM | LARGE | ～1080d |
| 5 | | | FLIER SITE C | 2013/01/01 00:00 | MOTHER | EVENING | BOTTOM | LARGE | ～1080e |
| 6 | | | HOUSEKEEPING BOOK APPLICATION | 2013/01/01 00:00 | MOTHER | EVENING | BOTTOM | LARGE | ～1080f |
| 7 | | | RECIPE RETRIEVAL SITE | 2013/01/01 00:00 | MOTHER | EVENING | BOTTOM | LARGE | ～1080g |
| 8 | | | FOOD ONLINE SHOPPING SITE | 2013/01/01 00:00 | MOTHER | EVENING | BOTTOM | LARGE | ～1080h |

| | MARKER | | FUNCTION | REGISTRATION DATE | USE TIME INFORMATION | | | |
|---|---|---|---|---|---|---|---|---|
| | ORIGINAL IMAGE | FEATURE AMOUNT | | | USER | PERIOD OF TIME | POSITION | HAND SIZE |
| 9 | ⊕ | ⊕ | RECIPE SELECTION APPLICATION | 2013/01/01 00:00 | MOTHER | EVENING | BOTTOM | LARGE | ~1080i
| 10 | ◐ | ◐ | RAMEN TIMER | 2013/01/01 00:00 | SON | NIGHT | BOTTOM | SMALL | ~1080j
| 11 | ▭ | ▭ | HOMEWORK APPLICATION | 2013/01/01 00:00 | DAUGHTER | EVENING | BOTTOM | SMALL | ~1080k
| 12 | | | NOTE OBTAINED BY SCANNING SCHOOL LUNCH LIST | 2013/01/01 00:00 | DAUGHTER | EVENING | BOTTOM | SMALL | ~1080m
| 13 | ▭ | ▭ | HOMEWORK APPLICATION | 2013/01/01 00:00 | DAUGHTER | EVENING | BOTTOM | SMALL | ~1080n
| 14 | ▭ | ▭ | HOMEWORK RETRIEVAL SITE | 2013/01/01 00:00 | DAUGHTER | EVENING | BOTTOM | SMALL | ~1080p

FIG.20

| | MARKER FEATURE AMOUNT | FUNCTION INFORMATION | REGISTRATION DATE | PRIORITY | PERIOD OF TIME | |
|---|---|---|---|---|---|---|
| 1 | | HOSPITAL SITE | 2013/01/01 00:00 | — | AFTERNOON | ~1540a |
| 2 | | HOSPITAL RESERVATION PAGE | 2013/01/01 00:00 | — | AFTERNOON | ~1540b |
| 3 | | HOSPITAL RESERVATION PAGE | 2013/01/02 00:00 | — | MORNING | ~1540c |
| 4 | | CAMPAIGN APPLICATION | 2013/01/01 00:00 | ○ | EVENING | ~1540d |
| 5 | | RECIPE RETRIEVAL SITE | 2013/01/01 00:00 | — | EVENING | ~1540e |
| 6 | | RECIPE RETRIEVAL SITE | 2013/01/01 00:00 | — | EVENING | ~1540f |
| 7 | | PERSONAL COMMUNICATION SITE | 2013/01/01 00:00 | — | EVENING | ~1540g |
| 8 | | PRODUCT SITE | 2013/01/01 00:00 | — | EVENING | ~1540h |

1540

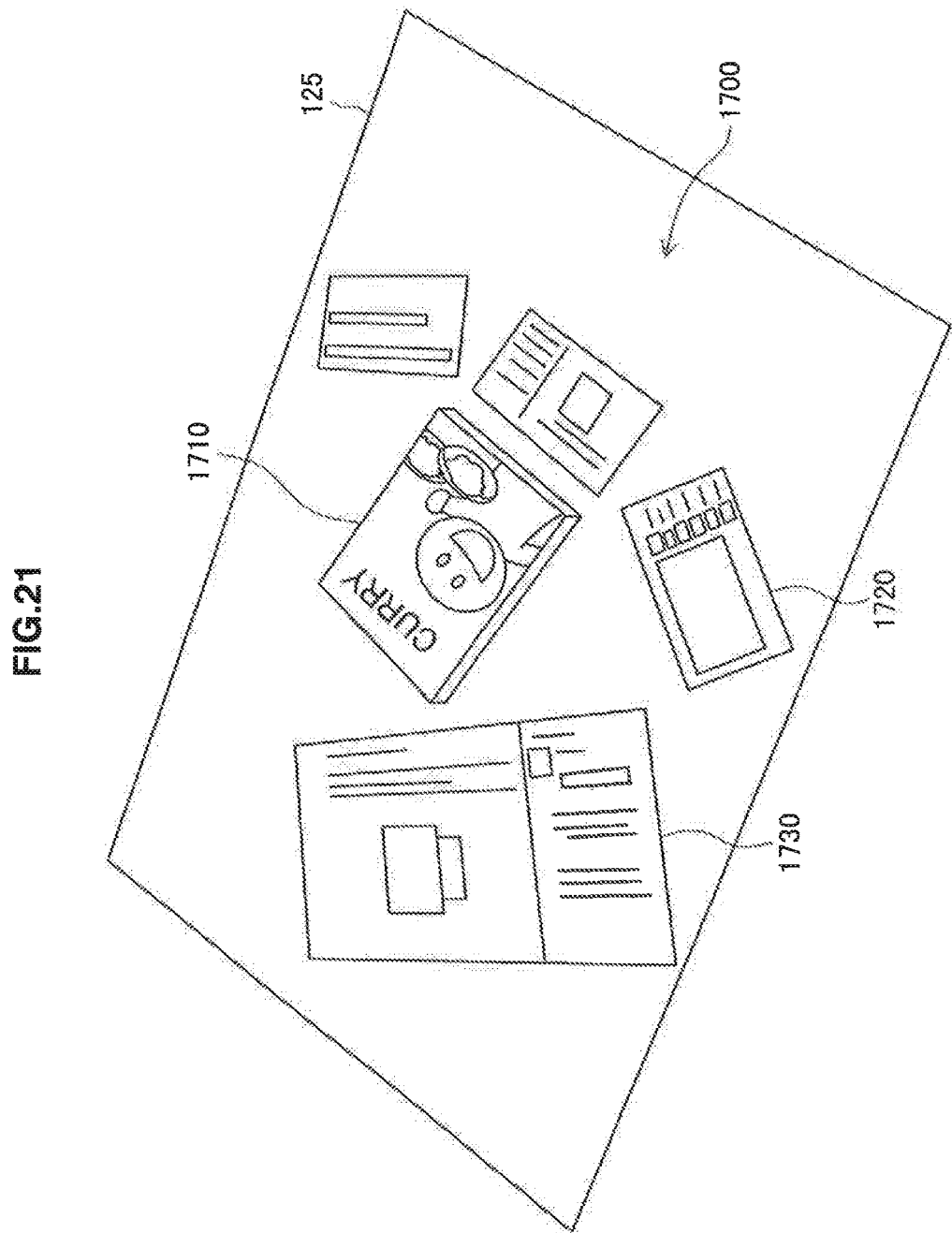

INFORMATION PROCESSING DEVICE, INFORMATION PROCESSING METHOD, AND PROGRAM

CROSS REFERENCE TO RELATED APPLICATIONS

This application is a continuation of U.S. patent Ser. No. 14/490,797 (filed on Sep. 19, 2014), which claims priority to Japanese Patent Application No. 2013-229360 (filed Nov. 5, 2013), which are all hereby incorporated by reference in their entirety.

BACKGROUND

The present disclosure relates to an information processing device, an information processing method, and a program.

JP 2006-48672A discloses a technology for improving operability when information of WWW is retrieved, by selecting image data suitable for image data received by a video camera among a plurality of pieces of image data stored to correspond to URLs of WWW servers of the Internet, reading designation information such as a URL corresponding to the selected image data, and accessing the WWW server designated by the designation information.

SUMMARY

In the technology disclosed in JP 2006-48672A, however, URLs allocated to the image data are fixed. Therefore, when image data is the same image data, access to the WWW server of the same URL is executed regardless of a context of a user's operation of retrieving WWW information. Accordingly, an improvement in operability obtained using image data has not been achieved to the degree of improvement obtained through adaptation to individual situations of users. Flexible association corresponding to individual situations of users has not yet been realized in technologies for improving operability when a function of a system is called using image data without being limited to the retrieval of WWW information.

It is desirable to provide a novel and improved information processing device, a novel and improved information processing method, and a novel and improved program capable of realizing flexible association corresponding to individual situations of users when a function of a system is called using image data.

According to an embodiment of the present disclosure, there is provided an information processing device including a retrieval unit configured to retrieve a data record in which a marker detected in an image acquired by a terminal device is associated with a function of the terminal device, and a calling function determination unit configured to determine the function to be called in the terminal device based on the data record found through the retrieval. The data record includes information generated based on a calling history of the function in which the marker in the terminal device is used.

According to another embodiment of the present disclosure, there is provided an information processing method including retrieving a data record in which a marker detected in an image acquired by a terminal device is associated with a function of the terminal device, and determining the function to be called in the terminal device based on the data record found through the retrieval. The data record includes information generated based on a calling history of the function in which the marker in the terminal device is used.

According to another embodiment of the present disclosure, there is provided a program causing a computer to realize a function of retrieving a data record in which a marker detected in an image acquired by a terminal device is associated with a function of the terminal device, and a function of determining the function to be called in the terminal device based on the data record found through the retrieval. The data record includes information generated based on a calling history of the function in which the marker in the terminal device is used.

According to one or more embodiments of the present disclosure described above, it is possible to realize flexible association corresponding to individual situations of users when a function of a system is called using image data.

The foregoing advantages are not necessarily limited, but any advantage obtained in the present specification or other advantages understood from the present specification may be obtained along with the foregoing advantages or instead of the foregoing advantages.

BRIEF DESCRIPTION OF THE DRAWINGS

FIG. 8A is a diagram illustrating examples of data records stored in a function DB according to the first embodiment of the present disclosure;

FIG. 8B is a diagram illustrating examples of data records stored in a function DB according to the first embodiment of the present disclosure;

FIG. 20 is a diagram illustrating examples of data stored in a function DB of a server according to the third embodiment of the present disclosure;

FIG. 21 is a diagram illustrating examples of information presented to a user according to the third embodiment of the present disclosure;

DETAILED DESCRIPTION OF THE EMBODIMENTS

Figure 1:
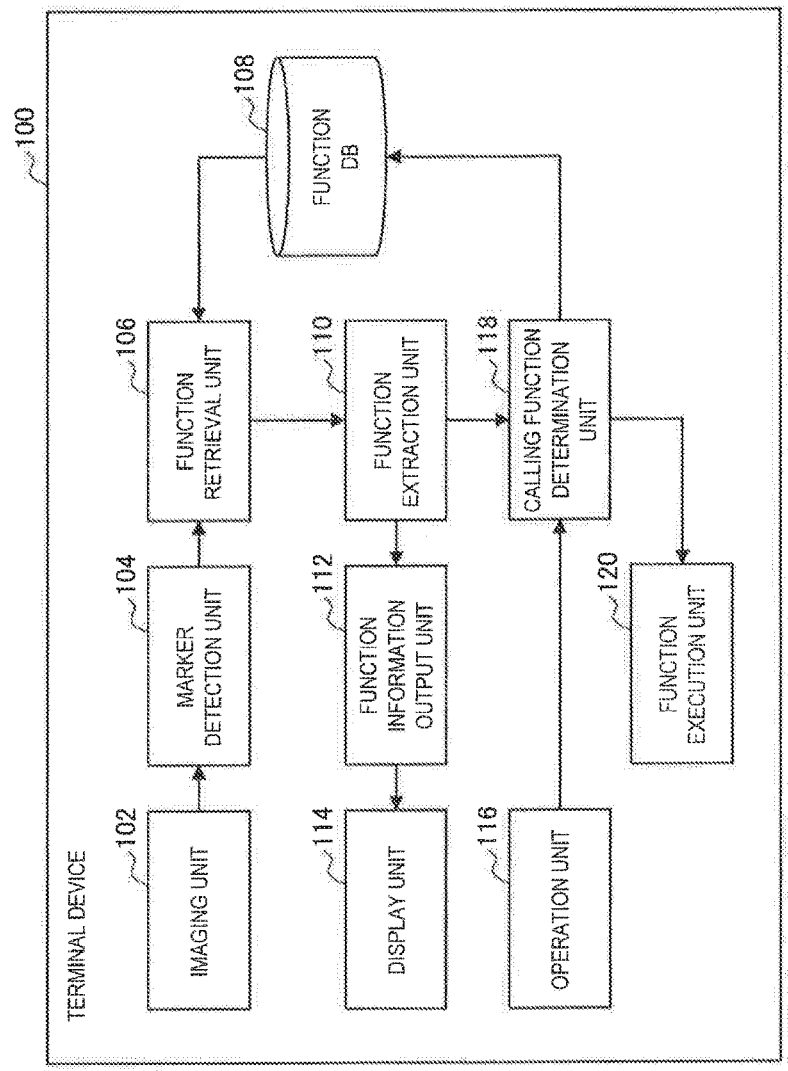
FIG. 1 is a block diagram illustrating an overall functional configuration of a terminal device according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. First embodiment
1-1. Functional configuration
1-2. Specific example of terminal device
1-3. Example of association operation
1-4. Example of data
1-5. Example of information presented to user
1-6. Example of use time information
2. Second embodiment
3. Third embodiment
3-1. Functional configuration
3-2. Example of data
3-3. Example of information presented to user
3-4. Example of function extraction process
4. Hardware configuration
5. Supplement 1. First Embodiment 1-1. Functional Configuration FIG. 1 is a block diagram illustrating an overall functional configuration of a terminal device according to a first embodiment of the present disclosure. Referring to FIG. 1, a terminal device 100 includes an imaging unit 102, a marker detection unit 104, a function retrieval unit 106, a function database (DB) 108, a function extraction unit 110, a function information output unit 112, a display unit 114, an operation unit 116, a calling function determination unit 118, and a function execution unit 120.

The terminal device 100 can be any of various kinds of devices capable of realizing the illustrated functional configuration. The functional configuration may be realized by, for example, a hardware configuration of an information processing device to be described below. For example, the imaging unit 102 can be realized by a camera module including an image sensor, an optical member, and a driving circuit. The function DB 108 can be realized by a memory or a storage. The display unit 114 can be realized by a display device such as an LCD or an organic EL display, a projector, or the like. The operation unit 116 can be realized by a touch panel, a keyboard, a mouse, a camera module, or the like. The remaining functional configuration can be realized by a processor such as a CPU operating according to a program stored in a memory or a storage. Hereinafter, each functional configuration will be further described.

The imaging unit 102 captures an image of an actual space using an image sensor. The imaging unit 102 may capture a moving image formed by continuous frames.

The marker detection unit 104 detects a marker included in an image by analyzing the image captured by the imaging unit 102. The marker may be any visual pattern shown in the actual space and the kinds of marker are not particularly limited. The marker may be formed in any manner as long as the marker has reproducibility and discriminability. For example, the marker may be a pattern of the surface of any object such as a card, a wallet, a pen case, a note, a dish, or a packaging container. The pattern may be a pattern printed or attached to be recognized as a marker or may be detected as a texture or part of the surface of an object without change. The marker detection unit 104 detects a marker using, for example, an image recognition method of the related art.

The function retrieval unit 106 retrieves a data record in which a marker detected in an image acquired by the terminal device 100, i.e., a marker detected by the marker detection unit 104, is associated with a function of the terminal device 100 in the function DB 108. Here, the function DB 108 stores, for example, a data record in which an image or a feature amount of a marker, which will be described below and is registered through an association operation by a user, is associated with a specific function of the terminal device 100. Here, as will be described below, a function is called using a marker in the terminal device. The data record of the function DB 108 further include information generated based on a calling history of a function in which the marker in the terminal device 100 is used. That is, the data record subsequently includes the information generated based on a history in which a function is called actually using the marker in addition to registration information of the marker. The function retrieval unit 106 retrieves the data record using information indicating the detected marker, e.g., the feature amount of the marker, as a key in the function DB 108. The function retrieval unit 106 supplies the data record found through the retrieval or information regarding the function indicated in the data record to the function extraction unit 110. Alternatively, the function retrieval unit 106 may supply the data record or the information regarding the function directly to the calling function determination unit 118.

The function information output unit 112 outputs information indicating a function associated with the marker in the data record found through the retrieval of the function retrieval unit 106 to the user. More specifically, for example, the function information output unit 112 outputs UI information to receive a user's input operation of calling some or all of the functions associated with the markers by the found data records. For example, the UI information may be output as images via the display unit 114 or may be output as audio via an audio output unit such as a speaker (not illustrated). When a plurality of functions are associated with the markers by the found data records, the UI information may be information used for the user to select a function to be called from the plurality of functions.

Here, the function information output unit 112 may output information indicating a predetermined number of functions associated with the markers in the data records to the user. That is, the number of functions indicated by the information output by the function information output unit 112 may be limited to the predetermined number. The predetermined number can be determined based on, for example, a display area of a display realizing the display unit 114 or a sustainable time of audio output by the speaker. In this case, when the number of functions indicated in the data records found through the retrieval of the function retrieval unit 106 is greater than the predetermined number, the function extraction unit 110 extracts the predetermined number of functions from the functions associated with the markers in the data records. The function extraction unit 110 supplies information indicating the extracted predetermined number of functions to the function information output unit 112. Alternatively, the function extraction unit 110 may supply the information indicating the extracted predetermined number of functions to the calling function determination unit 118. In this case, the extracted predetermined number of functions can be automatically called without giving a query to the user by the function information output unit 112. When the predetermined number of functions are extracted, the function extraction unit 110 can use various kinds of information included in the data records.

For example, when the marker detection unit 104 detects a plurality of markers including a first marker and a second marker from an image, the function extraction unit 110 may extract a function associated with the first marker and the second marker in the data record.

For example, the function extraction unit 110 may extract a function associated with a marker by a data record including information generated based on a calling history of a function by a user (for example, a user of the current terminal device 100) to which information is presented by the function information output unit 112. The terminal device 100 may not execute the foregoing extraction when a user to which information is presented is not specified due to the fact that a specific user does not execute login.

For example, the function extraction unit 110 may extract a function associated with the marker by a data record including information generated based on a calling history of a function at a period of time including a current time. More specifically, the function extraction unit 110 may extract a function so that information indicating a function called at the same period of time of a previous day or a further previous day in the terminal device 100 is presented to the user.

For example, when the position of a marker is detected in an image by the marker detection unit 104, the function extraction unit 110 may extract a function associated with the marker in the data record including the information generated based on a calling history of a function in which a marker located at a position identical to or near the detected position of the marker is used. For example, when the size of a hand of the user for which a marker is disposed in an image is detected by the marker detection unit 104, the function extraction unit 110 may extract a function associated with the marker in the data record including information generated based on a calling history of a function in which the marker disposed in the image by a hand with a size identical or similar to the detected size of the hand is used. More specific examples of such extraction processes will be described below.

The calling function determination unit 118 determines a function called in the terminal device based on the data record found through the retrieval of the function retrieval unit 106. For example, the calling function determination unit 118 determines a called function based on a user's input operation acquired by the operation unit 116. More specifically, the calling function determination unit 118 determines to call a function selected through a user's operation among a plurality of functions included in information presented by the function information output unit 112. Alternatively, when the number of functions shown by the data records found through the retrieval of the function retrieval unit 106 or the number of functions extracted by the function extraction unit 110 is less than a predetermined number of functions executable in the terminal device 100, the calling function determination unit 118 may determine a function to be called regardless of a user's operation.

When the calling function determination unit 118 determines a calling function, the calling function determination unit 118 associates the calling history of the function with information indicating the marker and adds the calling history to the function DB 108. At this time, for example, information regarding a user, a time, the position of the marker, the size of a hand for which the marker is disposed, or the like used in the process of the above-described function extraction unit 110 can be included in information regarding the calling history. As will be described below, in the function DB 108, the data record is not necessarily generated for each added calling history. For example, information regarding the added calling history can be used to update the previously present data records.

The function execution unit 120 calls and executes the functions of the terminal device 100 according to the determination of the calling function determination unit 118. The functions to be executed can include all kinds of functions executable in the terminal device 100. Although not illustrated, the imaging unit 102, the display unit 114, or the operation unit 116 may be used in the functions to be executed. For example, a communication unit (not illustrated) of the terminal device 100 or data other than the function DB 108 retained in the terminal device 100 may be used in the functions to be executed.

1-2. Specific Example of Terminal Device

Next, several specific examples of the terminal device according to the first embodiment of the present disclosure will be described with reference to FIGS. 2 to 5.

Figure 2:
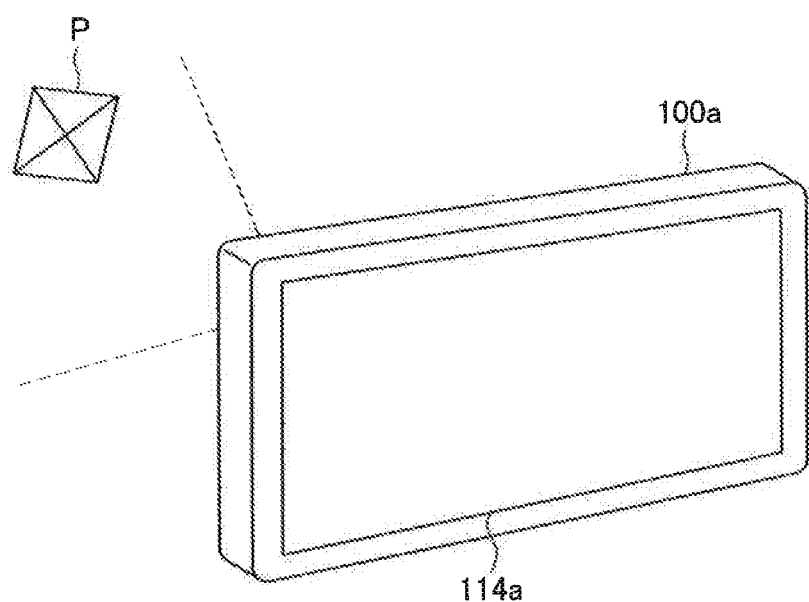
FIG. 2 is a diagram illustrating a first example of a terminal device according to the first embodiment of the present disclosure.

FIG. 2 is a diagram illustrating a first example of the terminal device according to the first embodiment of the present disclosure. Referring to FIG. 2, a terminal device 100a is a smartphone or a tablet terminal. In the terminal device 100a, a display installed on the front side of a casing functions as a display unit 14a. Although hidden in the drawing, a camera installed on the rear side of the casing functions as the imaging unit 102. A marker P is present in the actual space captured by the camera. The marker detection unit 104 detects the marker P included in an image of the actual space captured by the camera. In this case, however, since a positional relation between the camera and the actual space is variable, it is difficult for the marker detection unit 104 to specify an absolute position of the marker in the image (a relative position can be specified).

Figure 3:
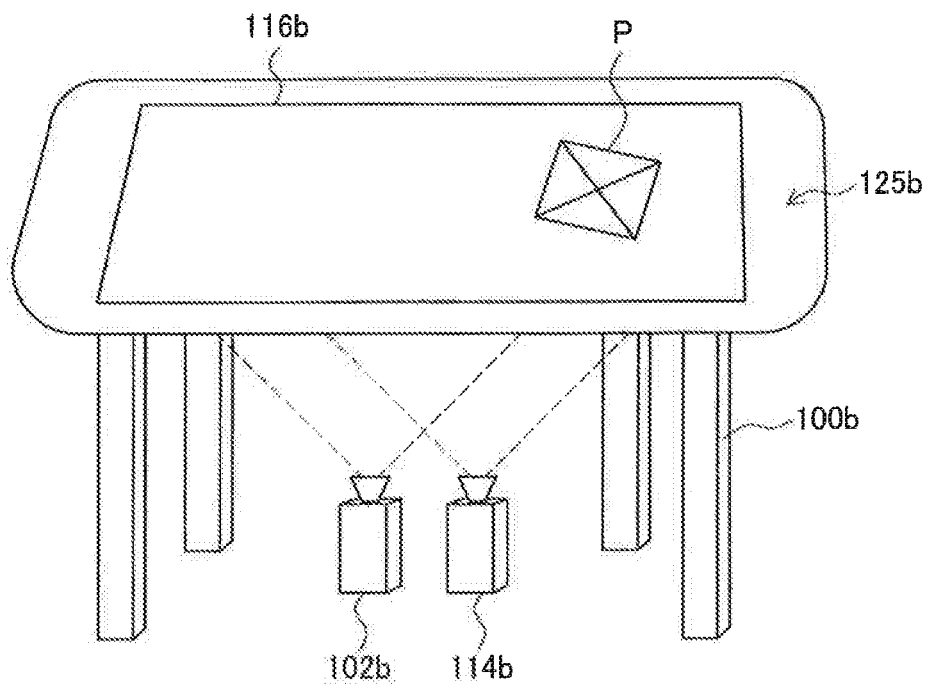
FIG. 3 is a diagram illustrating a second example of a terminal device according to the first embodiment of the present disclosure.

FIG. 3 is a diagram illustrating a second example of the terminal device according to the first embodiment of the present disclosure. Referring to FIG. 3, a terminal device 100b is a table (or desk) type terminal device. The terminal device 100b includes a table top (or a desk top) 125b having a transmission region. In the terminal device 100b, a camera installed below the table top 125b functions as an imaging unit 102b. More specifically, the camera captures an image including a marker P placed in the transmission region of the table top 125b. In the terminal device 100b, a projector installed below the table top 125b functions as a display unit 114b. The display unit 114b may be a transmissive display installed in the transmission region of the table top 125b. In the terminal device 100b, a touch panel installed in the transmission region of the table top 125b functions as an operation unit 116b.

Figure 4:
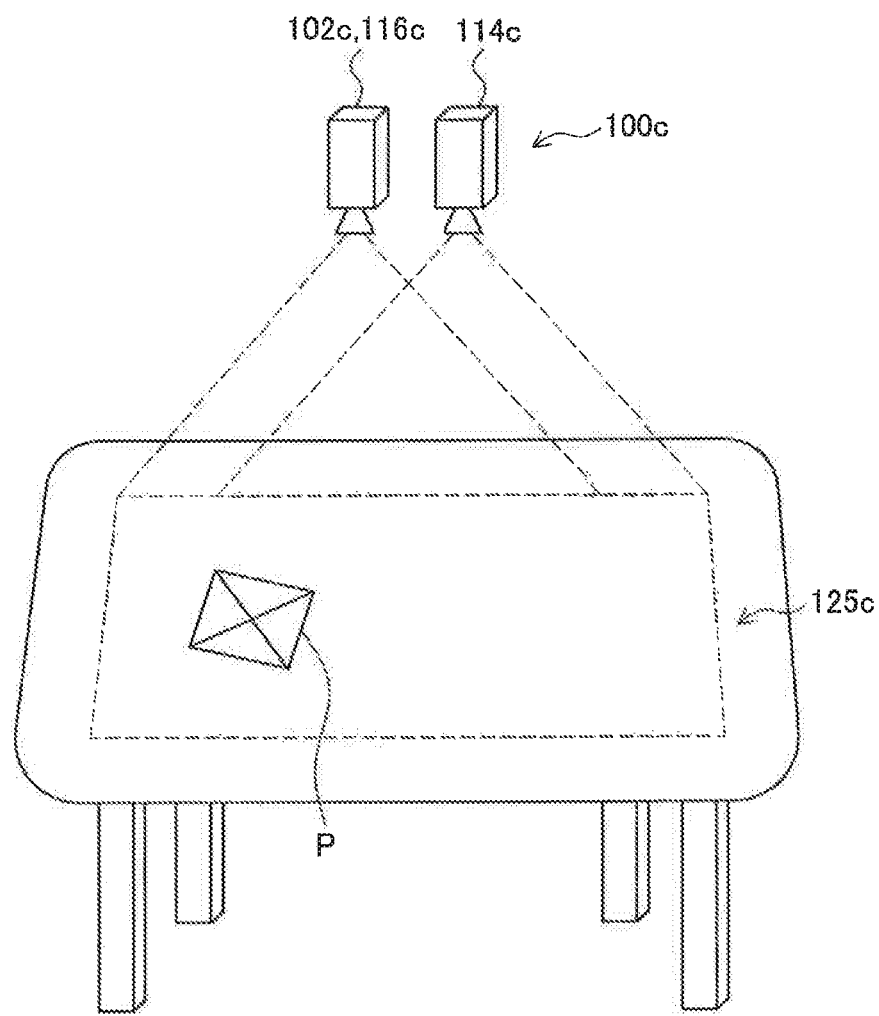
FIG. 4 is a diagram illustrating a third example of a terminal device according to the first embodiment of the present disclosure.

FIG. 4 is a diagram illustrating a third example of the terminal device according to the first embodiment of the present disclosure. Referring to FIG. 4, a terminal device 100c is a terminal device installed above a table. Unlike the foregoing second example, the terminal device 100c is independent from a table (or desk) having a table top (a desk top) 125c. The table top 125c may be a table top on which an image can be projected by a projector and may not have the transmission region of the second example. In the terminal device 100c, a camera installed above the table top 125c functions as an imaging unit 102c and an operation unit 116c. More specifically, the camera captures an image including a marker P placed on the table top 125c. The camera acquires a motion of a hand or the like of a user on the table top 125c as an input operation. In the terminal device 100c, a projector placed above the table top 125c functions as a display unit 114b.

There are several common points and different points between the foregoing second example illustrated in FIG. 3 and the third example. First, as the common points, the marker P is disposed on the table top 125 and a positional relation between the table top 125 and the camera of the terminal device is fixed in both of the examples. Therefore, the marker detection unit 104 can specify the absolute position of the marker in an image.

On the other hand, as the different points, in the second example, it is difficult for a user to perceive the marker since the marker P disposed on the table top 125b is imaged from the downward side by the camera. Conversely, in the third example, the user can also perceive the marker P since the marker P disposed on the table top 125c is imaged from the upward side by the camera. In the second example, when a hand of the user for which the marker P is disposed on the table top 125b is viewed from the imaging unit 102b, the hand of the user is located on the rear side of the marker P, and thus it is difficult to capture the hand in an image. Conversely, in the third example, when the hand of the user for which the marker P is disposed on the table top 125c is viewed from the camera, the hand of the user is located on the front side of the marker P, and thus the imaging unit 102c can capture the hand of the user along with the marker P in the image.

The terminal device 100b related to the second example can be a device integrated with the table since the camera or the projector is installed below the table top 125b and the touch panel is installed in the table top 125b. Conversely, the terminal device 100c related to the third example is independent from the table since the camera or the projector is installed above the table top 125c and the camera functions as the operation unit 116c.

Examples of configurations of the embodiment to be described below can be applied to, for example, the terminal devices 100a, 100b, and 100c related to the foregoing three examples or other terminal devices apparent from the description of the present specification. A configuration suitable for each terminal device 100 will be understood from the foregoing description. That is, for example, a configuration in which the marker detection unit 104 detects the position of the marker P in an image is suitable for the foregoing second and third examples. Further, for example, a configuration in which the marker detection unit 104 specifies information regarding the hand of the user for which the marker P is disposed is suitable for the foregoing third example.

Figure 5:
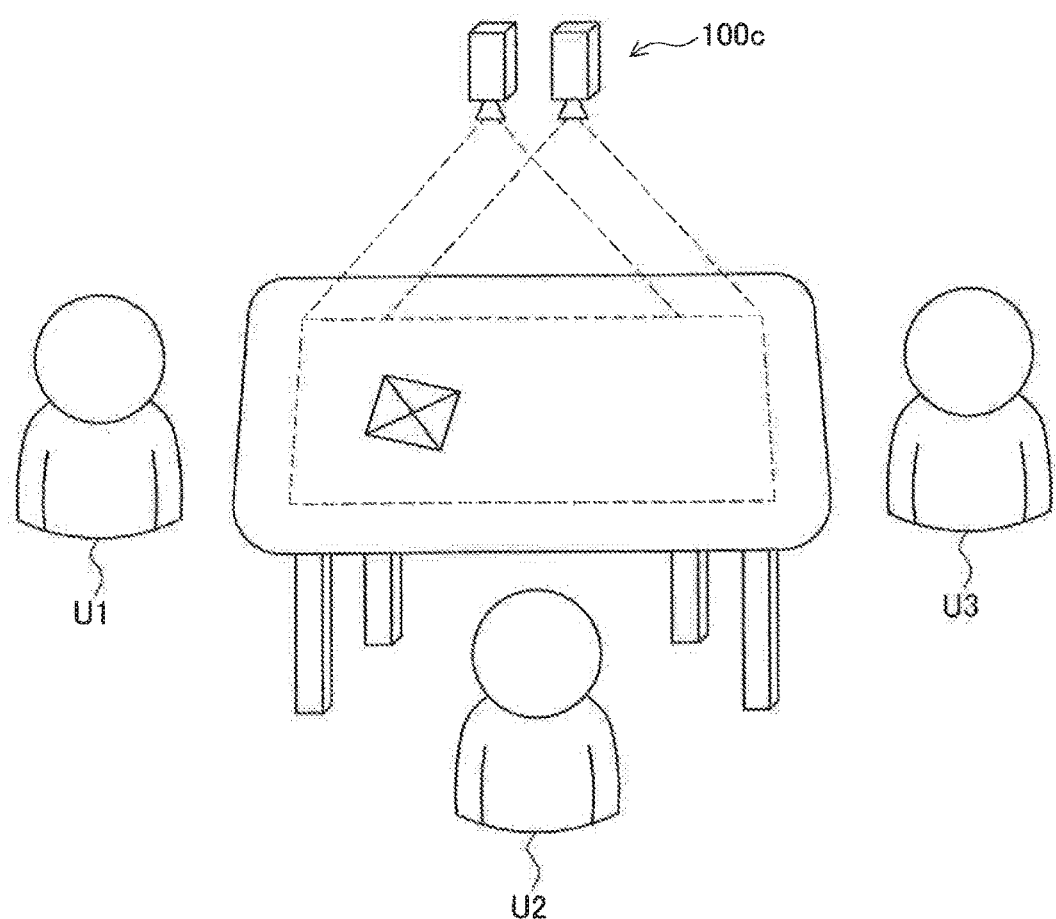
FIG. 5 is a diagram illustrating an example of a use form of the terminal device according to the first embodiment of the present disclosure.

FIG. 5 is a diagram illustrating an example of a use form of the terminal device according to the first embodiment of the present disclosure. Referring to FIG. 5, for example, the terminal device 100c can operate as a stand-alone device in regard to the processes up to the process of determining the above-described calling function. The terminal device 100c may be used only by a single user or may be commonly used by a plurality of users. In the illustrated example, the terminal device 100c is commonly used by three users U1 to U3.

1-3. Example of Association Operation

Figure 6:
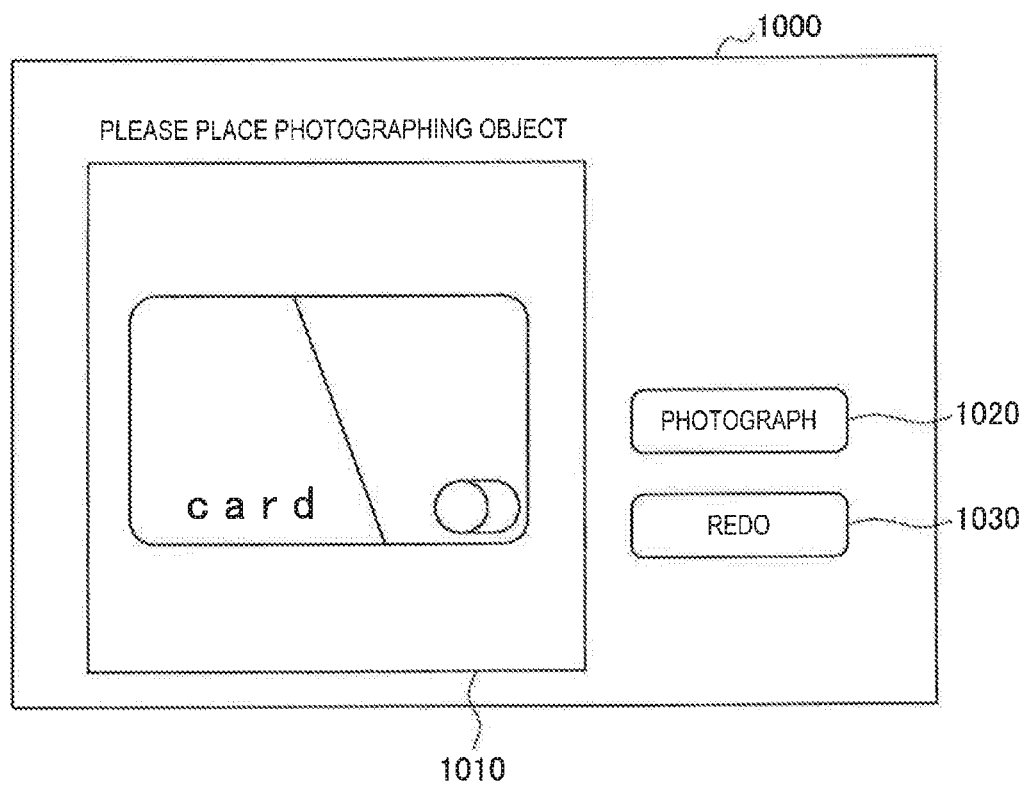
FIG. 6 is a diagram illustrating an example of a process of registering a marker using the terminal device according to the first embodiment of the present disclosure.

FIG. 6 is a diagram illustrating an example of a process of registering a marker using the terminal device according to the first embodiment of the present disclosure. Referring to FIG. 6, a registration screen 1000 includes a marker disposition region 1010, a photographing button 1020, and a restart button 1030. In the illustrated example, a pattern of the surface of a card is registered as a marker. Any card may be used. For example, an integrated circuit (IC) card, a cash card, a credit card, a member card, a point card, or the like can be used.

For example, when the registration screen 1000 is displayed with the terminal device 100a in the foregoing first example, the registration screen 1000 is displayed to overlap a live-view image displayed on the display and the live-view image is displayed transmissively in the marker disposition region 1010. The user moves the casing of the terminal device 100a to dispose an object registered as the marker inside the marker disposition region 1010, and then presses the photographing button 1020 in this state. When an error occurs, for example, when the object is not well recognized, the user presses the restart button 1030 to execute the photographing again.

For example, when the registration screen 1000 is displayed with the terminal device 100b in the foregoing second example, the registration screen 1000 is displayed in the transmission region of the table top 125b and the marker disposition region 1010 becomes transmissive. The user disposes an object inside the marker disposition region 1010, and then presses the photographing button 1020 in this state. At this time, since the object faces the surface recognized as the marker on the lower side of the table top 125*b*, the pattern of the card is on the back side unlike the illustrated example.

For example, when the registration screen 1000 is displayed with the terminal device 100*c* in the foregoing third example, the registration screen 1000 is projected on the table top 125*c*. The user disposes an object inside the marker disposition region 1010, and then presses the button 1020 in this state. At this time, since the object faces the surface recognized as the marker on the upper side of the table top 125*c*, the pattern of the card is on the front side like the illustrated example.

Figure 7:
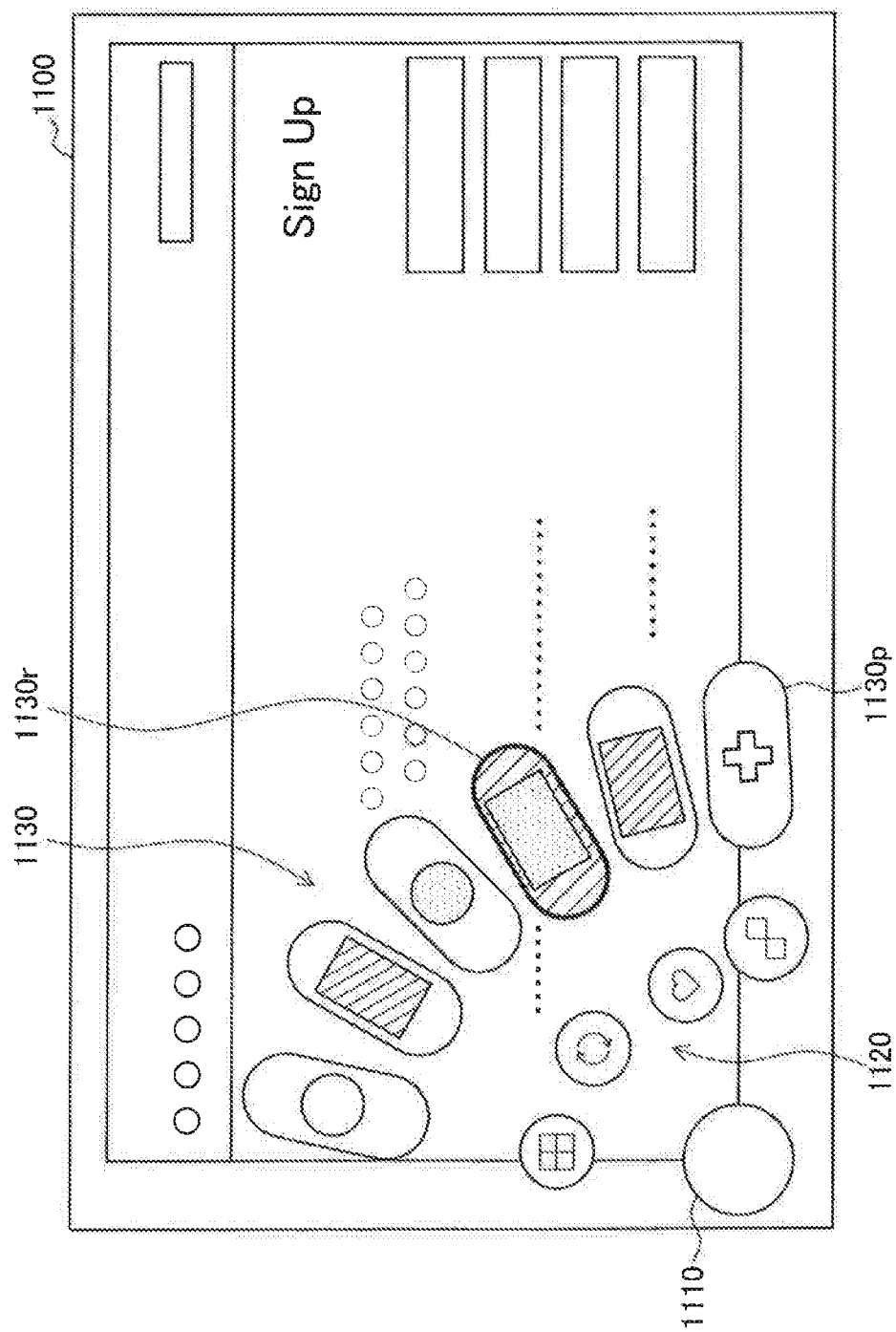
FIG. 7 is a diagram illustrating an example of a process of associating a function with a marker using the terminal device according to the first embodiment of the present disclosure.

FIG. 7 is a diagram illustrating an example of a process of associating a function with a marker using the terminal device according to the first embodiment of the present disclosure. Referring to FIG. 7, an association screen 1100 is displayed, for example, when any function (in the illustrated example, a website is displayed by a browser) is executed and the user presses a menu button 1110 in this state to display a menu item button 1120 and also presses a button such as "allocation" included in the menu item button 1120.

The association screen 1100 includes marker icons 1130. The marker icons 1130 display markers already registered through the registration process described above with reference to FIG. 6. When the user selects any one of the marker icons 1130, a currently executed function (before the association screen 1100 is displayed) can be associated with the selected marker.

The same function can also be associated with a plurality of markers. A marker icon 1130*r* indicating a marker already associated with a currently called function may be displayed, for example, in a different color, shape, or the like from the other icons. When a marker which the user wants to associate with the currently called function has not yet been registered, a marker icon 1130*p* indicating addition of a new marker may be selected and the registration screen 1000 described with reference to FIG. 6 may be called.

1-4. Example of Data

FIGS. 8A and 8B are diagrams illustrating examples of data records stored in the function DB according to the first embodiment of the present disclosure. Referring to FIGS. 8A and 8B, a data record 1080 stored in the function DB 108 of the terminal device 100 in the embodiment includes marker information, function information, registration date information, and use time information as elements. Hereinafter, each of the elements will be further described.

The marker information is registered through the above-described marker registration process. For example, the marker information includes an original image of the marker and a feature amount extracted from the original image. Although the feature amount is illustrated in a graphic form in the drawing, the feature amount can be actually recorded as a numerical value. For example, the original image of the marker is recorded based on an image captured in the registration process described above with reference to FIG. 6. The feature amount is extracted by executing predetermined image processing on the recorded original image. Since various technologies of the related art can be used for a process of extracting the feature amount, the detailed description will be omitted. Alternatively, the original image and the feature amount of the marker may be pre-installed or may be supplied from a server via a network.

The function information is registered through the above-described function association process. In the illustrated example, the function information is illustrated in a readable character string. However, in practice, for example, the name of a program module or the like of a calling destination can be recorded. In the illustrated example, two functions are associated with one marker in data records 1080*a* and 1080*b*. Three functions are associated with one marker in data records 1080*f* to 1080*h*. In this case, an example of information presented to the user by the function information output unit 112 will be described below.

For example, the registration date information may indicate a date on which the marker is first registered or may indicate a date on which the marker is finally used for the calling of the function.

For example, the use time information can include items of a user, a period of time, a position, or a hand size. In the illustrated example, all of these items are included in the use time information, but only one of these items may be included in the use time information. The use time information is used to extract a function to be presented to the user or a function to be called, as will be described below. Therefore, for example, when the markers and the functions are associated in a one-to-one manner as in data records 1080*c* to 1080*e*, the use time information is not necessarily necessary. In another example, even when the number of functions associated with the marker is limited to 1, the use time information may not necessarily be included in the data records 1080.

In the following description, a case in which the data records 1080 exemplified in FIGS. 8A and 8B are stored in the function DB 108 of the terminal device 100 will be described as an example. Accordingly, in the following description, the example illustrated in FIGS. 8A and 8B are appropriately referred to.

1-5. Example of Information Presented to User

Figure 9:
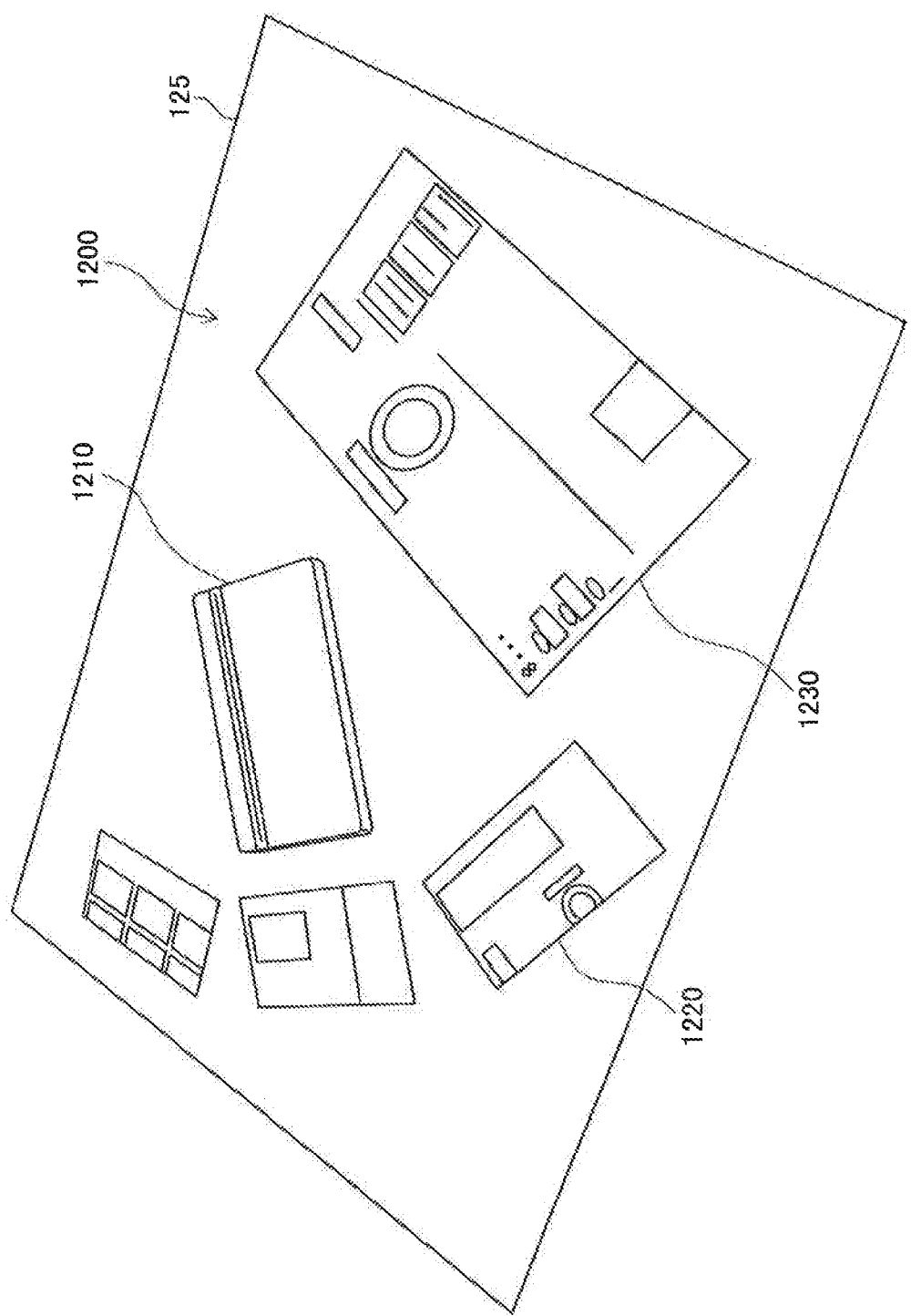
FIG. 9 is a diagram illustrating a first example of information presented to a user according to the first embodiment of the present disclosure.

FIG. 9 is a diagram illustrating a first example of information presented to a user according to the first embodiment of the present disclosure. Referring to FIG. 9, an image 1200 is projected on the table top 125. The image 1200 includes a candidate function image 1220 and a function image 1230.

In this example, the imaging unit 102 of the terminal device 100 captures an image including an object 1210 (wallet) placed on the table top 125. The marker detection unit 104 detects the object 1210 as a marker from the captured image. The function retrieval unit 106 retrieves the function DB 108 and finds the data records 1080*f* to 1080*h* for which the object 1210 serves as the marker. The function extraction unit 110 extracts a function presented as a candidate to the user from the functions shown by these data records.

In the illustrated example, the number of functions which can be presented as the candidate function images 1220 to the user in the image 1200 is 3. Therefore, all of the three functions included in the found data are extracted to be presented as candidates to the user. Accordingly, the function information output unit 112 presents the candidate function images 1220 indicating the three functions (a housekeeping book application, a recipe retrieval site, and an online food shopping site) shown by the data records 1080*f* to 1080*h* to the user in the image 1200.

When the user touches one of the candidate function images 1220 in the image 1200, the operation unit 116 (a camera or a touch panel on the table top 125) detects a motion of a user's hand and the calling function determination unit 118 accordingly determines to call a function corresponding to the touched candidate function image 1220. The function image 1230 is displayed by the display unit 114 when the function execution unit 120 executes the function according to the determination of the calling function determination unit 118.

In the foregoing example, the candidate function images 1220 displayed in the image 1200 are continuously displayed even after the user selects the calling function. Accordingly, after the user uses a first function by the function image 1230, the user can further select another candidate function image 1220 and use a second function.

In the example of FIG. 9, more specifically, for example, when the user returns from shopping and places a wallet (object 1210) on the table top 125, the image 1200 is displayed. Here, the user first selects the housekeeping book application (associated with the object 1210 in the data record 1080f) among the candidate function images 1220 and records shopping content. Next, the user selects the recipe retrieval site (associated with the object 1210 in the data record 1080g) among the continuously displayed candidate function images 1220 and retrieves a dinner recipe according to the shopping content. Further, when the user realizes that some food ingredients are out of stock during the retrieval of the recipe or after starting cooking based on the recipe, the user may select the food online shopping site (associated with the object 1210 in the data record 1080h) among the candidate function images 1220 that are still displayed and order the selected food ingredients.

Thus, the plurality of functions associated with the same object may be selectively executed according to the use time information, and a user's input operation or the like or may be executed in parallel as in the foregoing example or alternately. In this case, the function information output unit 112 may continuously output UI information even after the function to be called is determined by the calling function determination unit 118.

Figure 10:
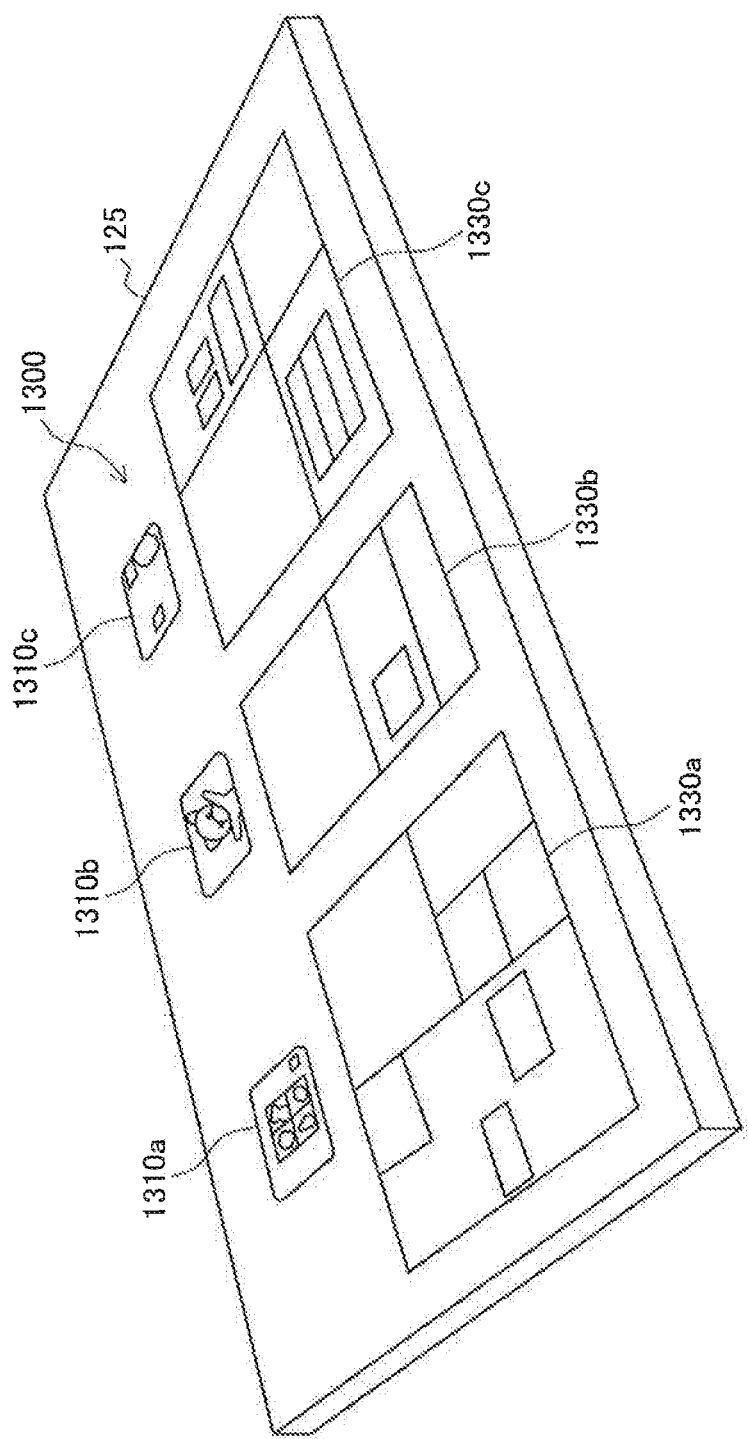
FIG. 10 is a diagram illustrating a second example of information presented to a user according to the first embodiment of the present disclosure.

FIG. 10 is a diagram illustrating a second example of the information presented to a user according to the first embodiment of the present disclosure. Referring to FIG. 10, an image 1300 is projected on the table top 125. The image 1300 includes a function image 1330.

In this example, the imaging unit 102 of the terminal device 100 captures an image including objects 1310a to 1310c (all of which are store point cards) placed on the table top 125. The marker detection unit 104 detects the objects 1310a to 1310c as markers from the captured image. The function retrieval unit 106 retrieves the function DB 108 and finds the data records 1080c to 1080e for which the objects 1310a to 1310c serve as the markers.

Here, the markers and the functions are all associated in a one-to-one manner in the data records 1080c to 1080e. Thus, in the terminal device 100, the processes of the function extraction unit 110 and the function information output unit 112 are skipped and the calling function determination unit 118 determines to call the functions corresponding to the markers. The function images 1330a to 1330c are displayed by the display unit 114 when the function execution unit 120 executes the functions (flier sites A to C) according to the determination of the calling function determination unit 118.

As in the foregoing example, when the markers and the functions are associated in the one-to-one manner in the data records stored in the function DB 108, the functions found through the retrieval by the function retrieval unit 106 may be determined as functions executed in the terminal device 100 by the function execution unit 120 without change. As in the foregoing examples, when a plurality of markers are recognized in an image captured by the imaging unit 102, the marker detection unit 104, the function retrieval unit 106, the calling function determination unit 118, and the function execution unit 120 may execute the processes on the markers in parallel and execute the plurality of functions simultaneously.

As another example, when a plurality of markers are recognized in an image captured by the imaging unit 102, information inquiring about whether to call a function associated with a certain marker may be output by the function information output unit 112 and the calling function determination unit 118 may determine to selectively call a function associated with one of the plurality of markers according to a user's operation acquired via the operation unit 116.

Figure 11:
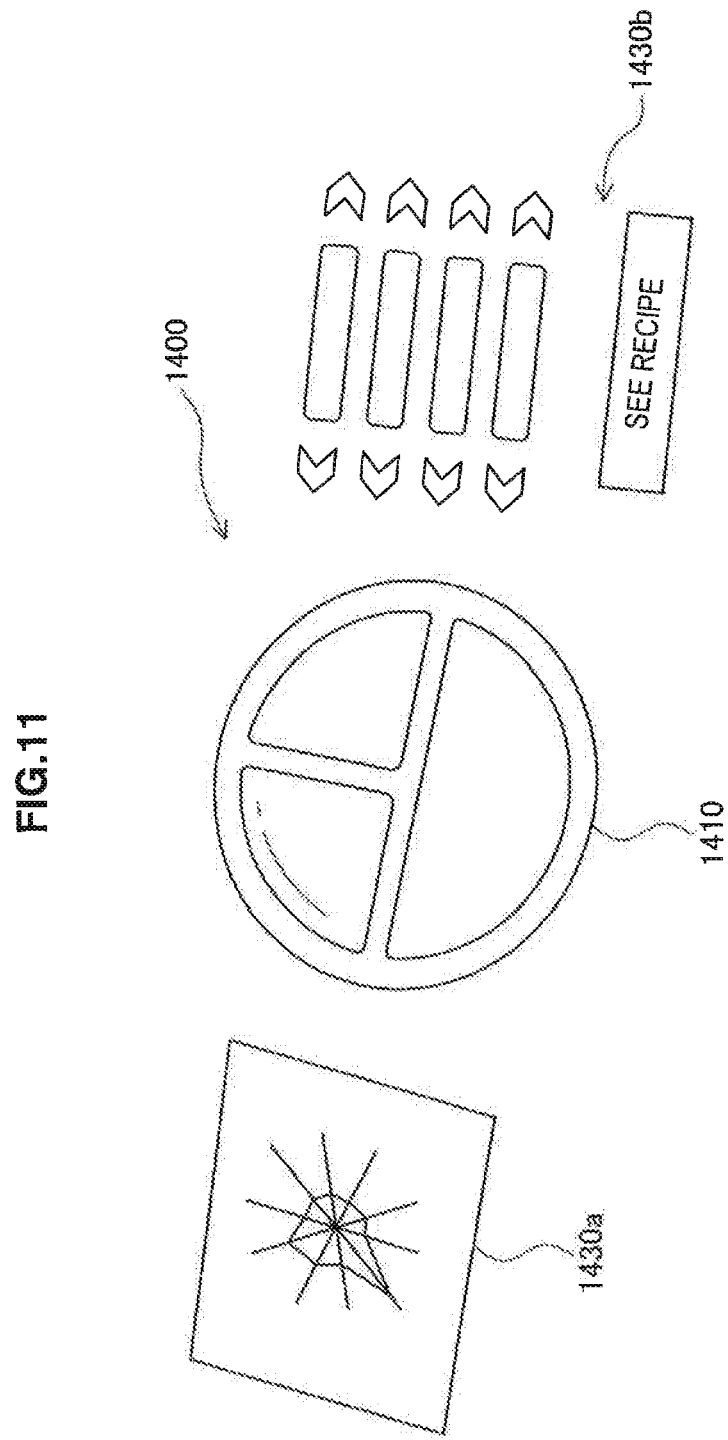
FIG. 11 is a diagram illustrating a third example of information presented to a user according to the first embodiment of the present disclosure.

FIG. 11 is a diagram illustrating a third example of the information presented to a user according to the first embodiment of the present disclosure. Referring to FIG. 11, an image 1400 is projected on the table top 125. The image 1400 includes function images 1430a and 1430b.

In this example, the imaging unit 102 of the terminal device 100 captures an image including an object 1410 (lunch plate) placed on the table top 125. The marker detection unit 104 detects the imaged object 1410 as a marker. The function retrieval unit 106 retrieves the function DB 108 and finds a data record 1080i for which the object 1410 serves as the marker.

Here, the marker and the function are associated in a one-to-one manner in the data record 1080i. Thus, in the terminal device 100, the processes of the function extraction unit 110 and the function information output unit 112 are skipped and the calling function determination unit 118 determines to call the function corresponding to the marker of the object 1410. The function images 1430a and 1430b are displayed by the display unit 114 when the function execution unit 120 executes a function (recipe selection application) according to the determination of the calling function determination unit 118. As in the illustrated example, two or more function images 1430 may be displayed for a single function.

Figure 12:
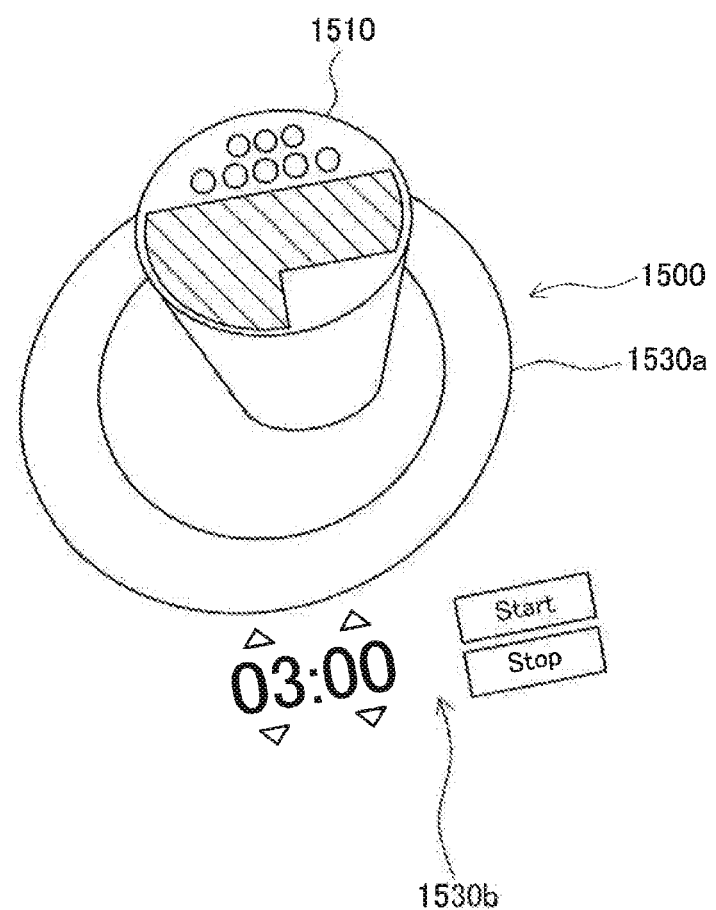
FIG. 12 is a diagram illustrating a fourth example of information presented to a user according to the first embodiment of the present disclosure.

FIG. 12 is a diagram illustrating a fourth example of the information presented to a user according to the first embodiment of the present disclosure. Referring to FIG. 12, an image 1500 is projected on the table top 125. The image 1500 includes function images 1530a and 1530b.

In this example, the imaging unit 102 of the terminal device 100 captures an image including an object 1510 (cup noodle container) placed on the table top 125. The marker detection unit 104 detects the imaged object 1510 as a marker. The function retrieval unit 106 retrieves the function DB 108 and finds a data record 1080j for which the object 1510 serves as the marker.

Here, the marker and the function are associated in a one-to-one manner in the data record 1080j. Thus, in the terminal device 100, the processes of the function extraction unit 110 and the function information output unit 112 are skipped and the calling function determination unit 118 determines to call the function corresponding to the marker of the object 1510. The function images 1530a and 1530b are displayed by the display unit 114 when the function execution unit 120 executes a function (ramen timer) according to the determination of the calling function determination unit 118.

As in the illustrated example, for example, the object 1510 may not necessarily be a flat object such as a wallet or a card. For example, an object with a height, such as the object 1510, may be used. In this case, for example, the object 1510 can be disposed such that a label surface faces the imaging unit 102 and can be used as a marker.

Figure 13:
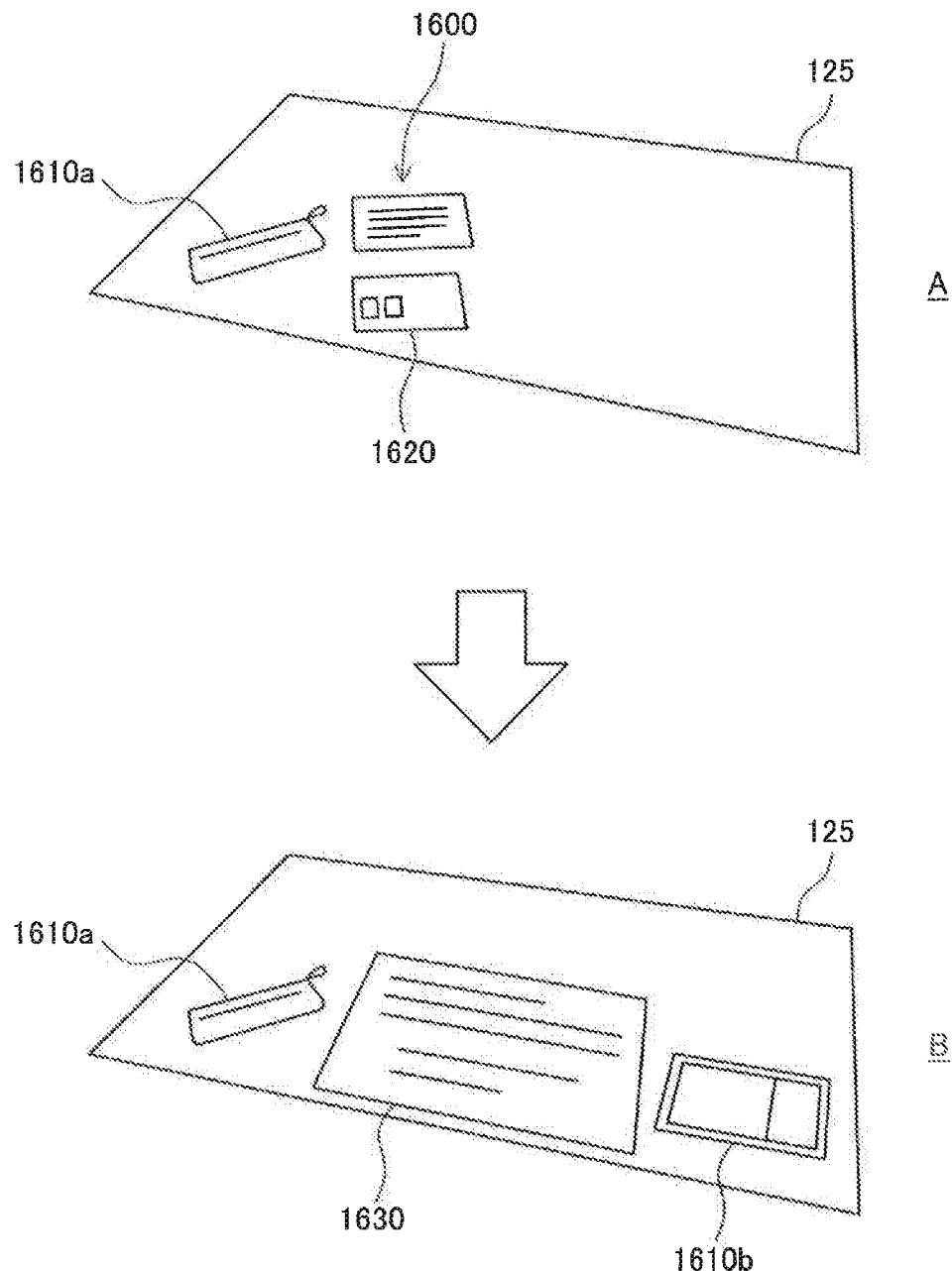
FIG. 13 is a diagram illustrating a fifth example of information presented to a user according to the first embodiment of the present disclosure.

FIG. 13 is a diagram illustrating a fifth example of the information presented to a user according to the first embodiment of the present disclosure. Referring to FIG. 13, an object 1610a (pen case) is first placed on the table top 125. At this time, the imaging unit 102 of the terminal device 100 captures an image including the object 1610a. The marker detection unit 104 detects the imaged object 1610a as a marker from the captured image. The function retrieval unit 106 retrieves the function DB 108 and finds data records 1080k and 1080m for which the object 1610a serves as the marker.

In the data records 1080k and 1080m, two functions (a homework application and a note obtained by scanning a school lunch list) are associated with the object 1610a. Since the number of functions which can be presented as candidate function images 1620 to the user in an image 1600 projected on the table top 125 is 2 or more, both of the foregoing two functions are displayed as the candidate function images 1620 in the image 1600.

Next, as illustrated in FIG. 13, the user also places an object 1610b (notebook) on the table top 125 without selecting any one of the candidate function images 1620. At this time, the imaging unit 102 of the terminal device 100 captures an image including two objects 1610a and 1610b. The marker detection unit 104 detects the imaged objects 1610a and 1610b as markers from the captured image. The function retrieval unit 106 retrieves the function DB 108 and finds data records 1080k to 1080p for which the objects 1610a and 1610b serve as the markers.

As described above, in the data records 1080k and 1080m, the two functions (the homework application and the note obtained by scanning a school lunch list) are associated with the object 1610a. On the other hand, in the data records 1080n and 1080p, the two functions (the homework application and a homework retrieval site) are also associated with the object 1610b. Here, in the data record 1080k and the data record 1080m, the two markers (objects 1610a and 1610b) are associated with the same function (homework application). In the illustrated example, since both of the two markers (objects 1610a and 1610b) are detected, it can be estimated that the function (homework application) commonly associated with the markers is highly likely to be called.

Thus, the calling function determination unit 118 determines to call the function of the homework application based on the data records 1080k and 1080n. The function execution unit 120 executes the function (homework application) based on the determination of the calling function determination unit 118. Accordingly, as illustrated in FIG. 13, a function image 1630 is displayed instead of the candidate function image 1620 in the image 1600.

1-6. Example of Use Time Information

As described with reference to FIGS. 8A and 8B, in the embodiment, the use time information can be included in the data records 1080 stored in the function DB 108 of the terminal device 100. When the registered marker is used to call the function, information regarding the user using the marker or a period of time in which the marker is used is recorded in the use time information. A value recorded in the use time information may be an average value of the use times, for example, when the marker is used a plurality of times. Alternatively, the use time information may be recorded only for an item in which a result in which the marker is used a predetermined number of times or more or a tendency equal to or greater than a predetermined strength is shown by the user, in the period of time, or the like (this may be retained separately as information not used to select the function). When a plurality of tendencies are shown in the use time information in spite of the fact that the same function is called using the same marker, a plurality of the data records may be generated as the data records 1080.

In the case of the foregoing example of FIGS. 8A and 8B, for example, the information regarding the user in the use time information indicates a use logging into the terminal device 100 when the function is called using the marker. For example, in the case of the marker of the same card shown in the data records 1080a and 1080b, the fact that a function to be called is highly likely to be "train operation information site" when the user logging into the terminal device is "father" and a function to be called is highly likely to be "point card website" when the user logging into the terminal device is "son" can be estimated based on the use time information. Further, when the terminal device 100 is a device which can be freely used commonly by a plurality of users (for example, family members) without logging into the terminal device, information regarding the users may not be acquired or recorded.

Information regarding the period of time in the use time information indicates a period of time in which a function is called using a marker. For example, in the case of the marker of the card shown in the data records 1080a and 1080b, the fact that a function to be called is highly likely to be "train operation information site" when the period of time is "morning" and a function to be called is highly likely to be "point card website" when the period of time is "afternoon" can be estimated apart from the foregoing estimation based on the user logging into the terminal device.

Figure 14:
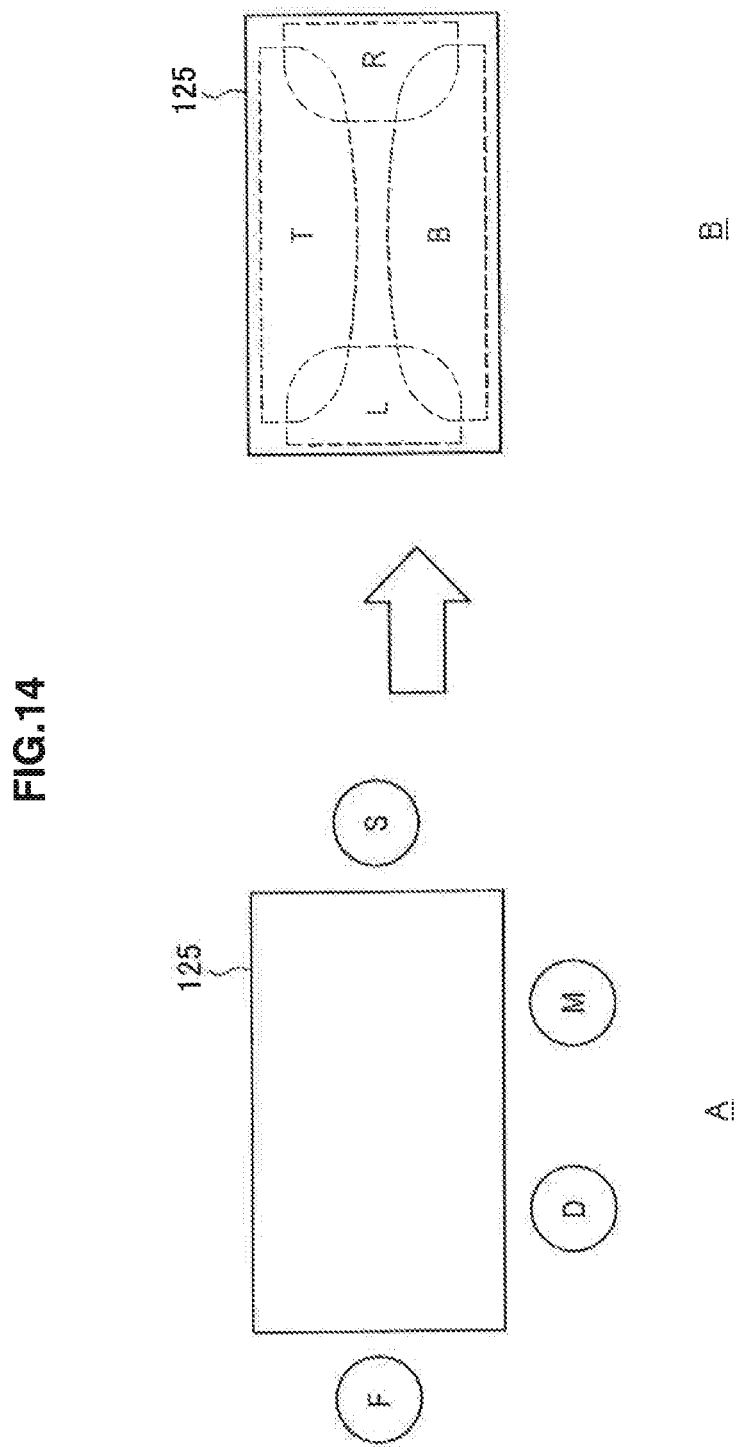
FIG. 14 is a diagram for describing an example of information regarding a position included in use time information according to the first embodiment of the present disclosure.

FIG. 14 is a diagram for describing an example of information regarding a position included in use time information according to the first embodiment of the present disclosure. In the illustrated example, as illustrated in FIG. 14, a father (F), a daughter (D), a mother (M), and a son (S) ordinarily sit at nearly fixed positions around the table top 125. In this case, for example, as illustrated in FIG. 14, by setting left (L), right (R), top (T), and bottom (B) regions on the table top 125, it can be estimated who places an object treated as a marker on the table top 125 among the foregoing 4 users.

Figure 15:
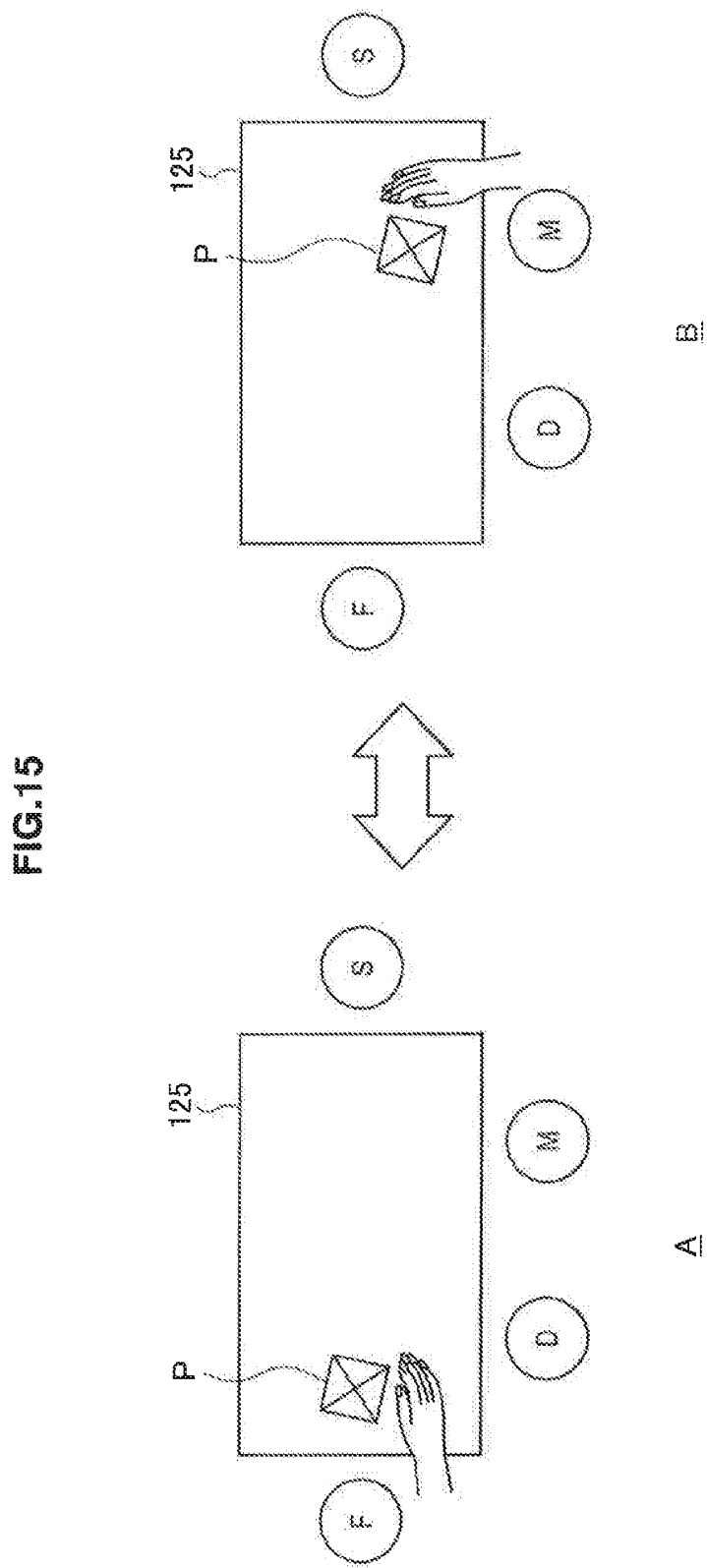
FIG. 15 is a diagram for describing an example of information regarding a position included in use time information according to the first embodiment of the present disclosure.

More specifically, for example, as illustrated in FIG. 15, when a marker P is placed on the table top 125 by the father (F), there is a high probability of the position of the marker P being included in the left (L) region illustrated in FIG. 14. As illustrated in FIG. 15, when the marker P is placed on the table top 125 by the mother (M), there is a high probability of the position of the marker P being including in the bottom (B) region illustrated in FIG. 14.

In the foregoing example, it may not necessarily be estimated specifically that the user is uniquely specified based on the position of the marker P or who the user is. For example, when the marker P is placed on the table top 125 by the mother (M) or is placed on the table top 125 by the daughter (D), there is a high probability of the position of the marker P being included in the bottom (B) region illustrated in FIG. 14. In this case, whether the user placing the marker P is the mother (M) or the daughter (D) may not be determined based on the information regarding the position.

For example, when another mechanism proves that the user using the marker P is the mother (M) or the father (F) and the marker P is placed on the bottom (B) region, it can be estimated that the user placing the marker P is the mother.

Figure 16:
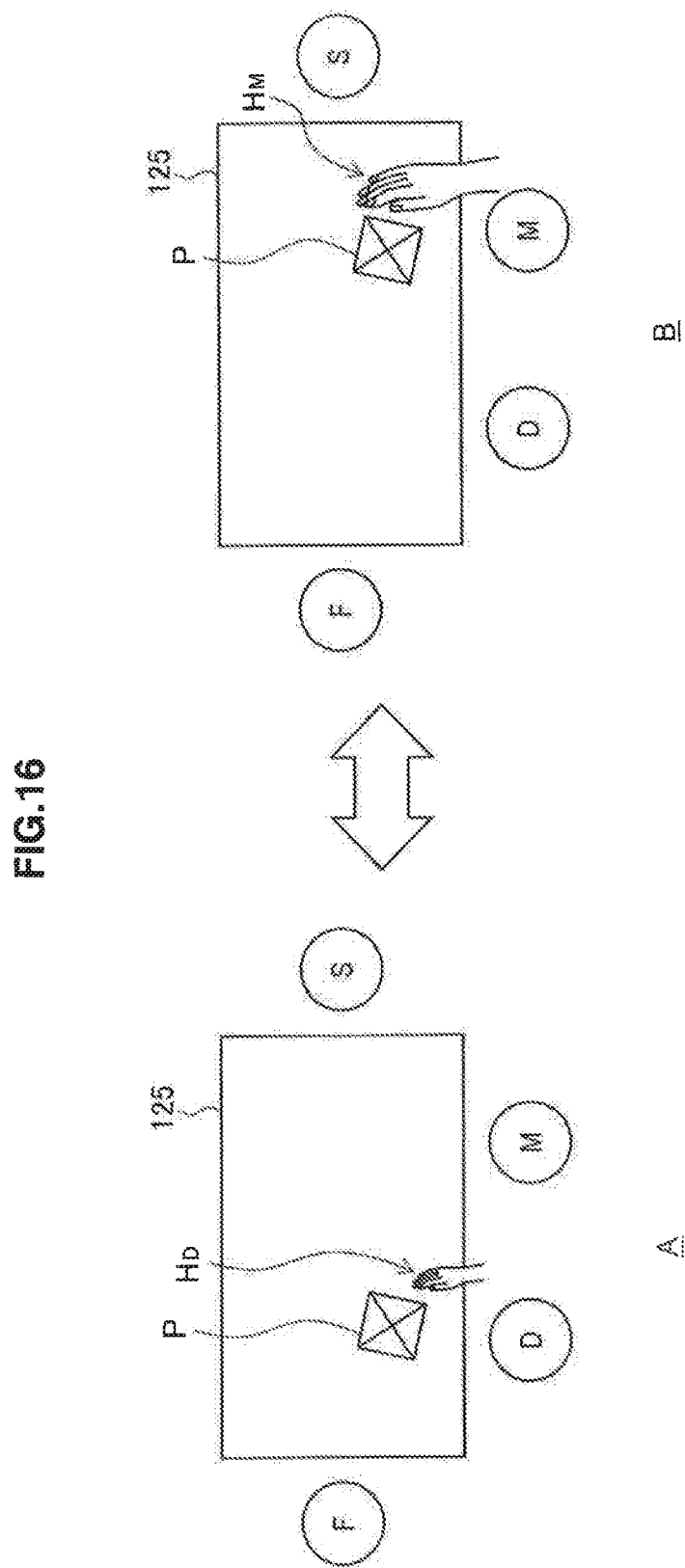
FIG. 16 is a diagram for describing an example of information regarding a hand size in the use time information according to the first embodiment of the present disclosure.

FIG. 16 is a diagram for describing an example of information regarding the hand size in the use time information according to the first embodiment of the present disclosure. In the illustrated example, for example, as illustrated in FIG. 16, when the marker P is placed on the table top 125 by the daughter (D), the size of a hand HD of the daughter is identified. Further, as illustrated in FIG. 16, when the marker P is placed on the table top 125 by the mother (M), the size of a hand $H_M$ of the mother is identified. Thus, for example, when the position of the marker P is in the bottom (B) region in the example described above with reference to FIG. 15, it can be determined based on the size of the hand whether the user placing the marker P is the mother (M) or the daughter (D). Alternatively, irrespective of the position of the marker P, the user placing the marker P on the table top 125 may be identified based on the size of the hand.

2. Second Embodiment

Figure 17:
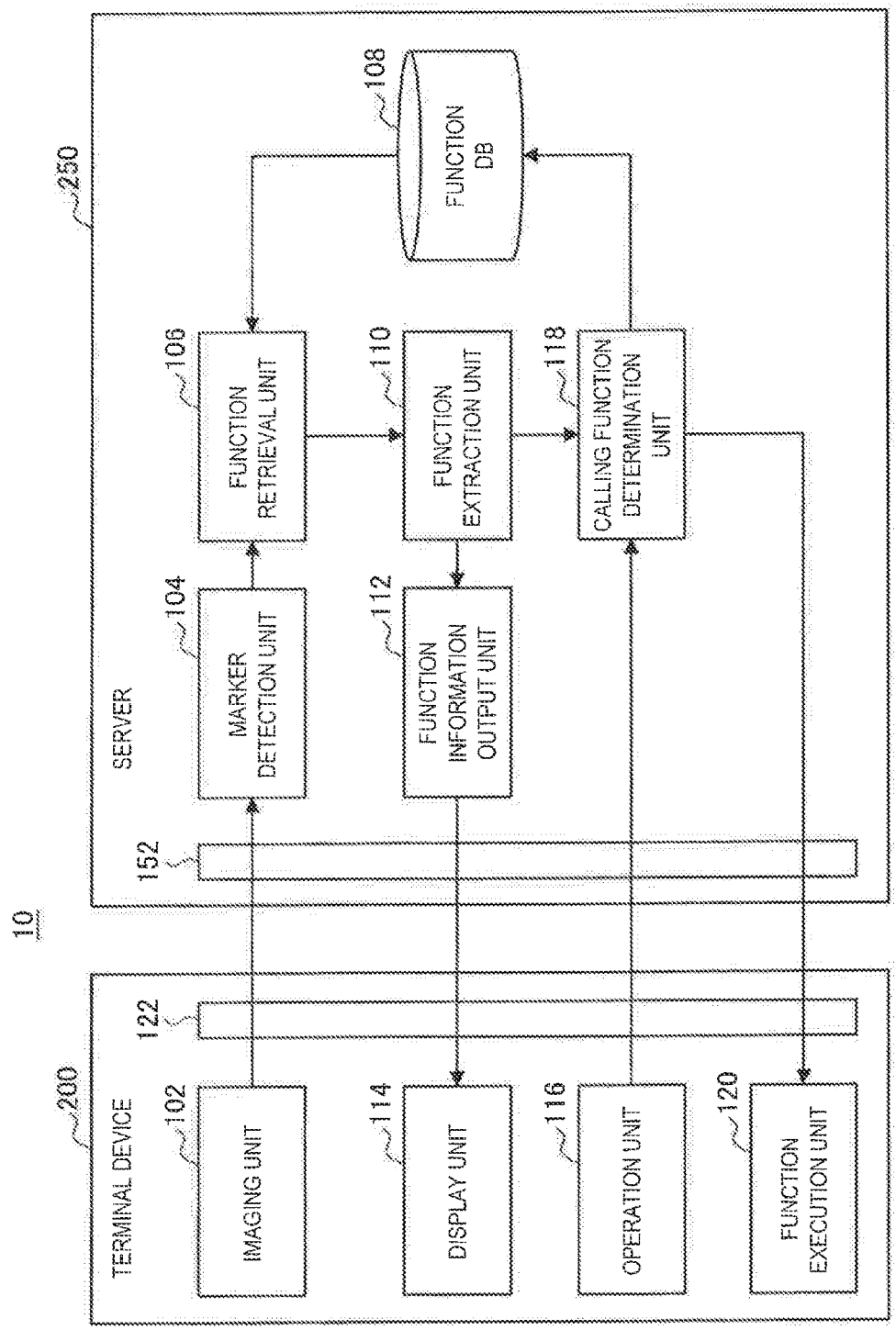
FIG. 17 is a block diagram illustrating an overall functional configuration of a system according to a second embodiment of the present disclosure.

FIG. 17 is a block diagram illustrating an overall functional configuration of a system according to a second embodiment of the present disclosure. Referring to FIG. 17, a system 10 includes a terminal device 200 and a server 250. The terminal device 200 includes an imaging unit 102, a display unit 114, an operation unit 116, a function execution unit 120, and a communication unit 122. The server 250 includes a marker detection unit 104, a function retrieval unit 106, a function DB 108, a function extraction unit 110, a function information output unit 112, a calling function determination unit 118, and a communication unit 152.

In the embodiment, the functions realized by the terminal device 100 according to the foregoing first embodiment are distributed and realized by the terminal device 200 and the server 250. More specifically, functions related to input and output in the imaging unit 102, the display unit 114, and the operation unit 116, and the function execution unit 120 are realized by the terminal device 200. Information processing functions of the marker detection unit 104, the function retrieval unit 106, the calling function determination unit 118, and the like are realized by the server 250. Since the individual functional configurations are the same as those described in the first embodiment, the detailed description will be omitted.

The terminal device 200 and the server 250 communicate via the communication units 122 and 152 and a network. The communication units 122 and 152 are realized by, for example, various wired or wireless communication devices. The terminal device 200 can be, for example, a device such as the terminal devices 100a to 100c described in the first embodiment and can be realized by a hardware configuration of an information processing device to be described below. The server 250 is configured as, for example, a single server device or a plurality of server devices, and the individual server device can be realized by the hardware configuration of the information processing device to be described below.

As illustrated, the communication unit 152 in the server 250 receives an image including a marker from the terminal device 200 which is an external device. The communication unit 152 transmits information indicating a function determined to be called by the calling function determination unit 118 to the terminal device 200 which is the external device.

Figure 18:
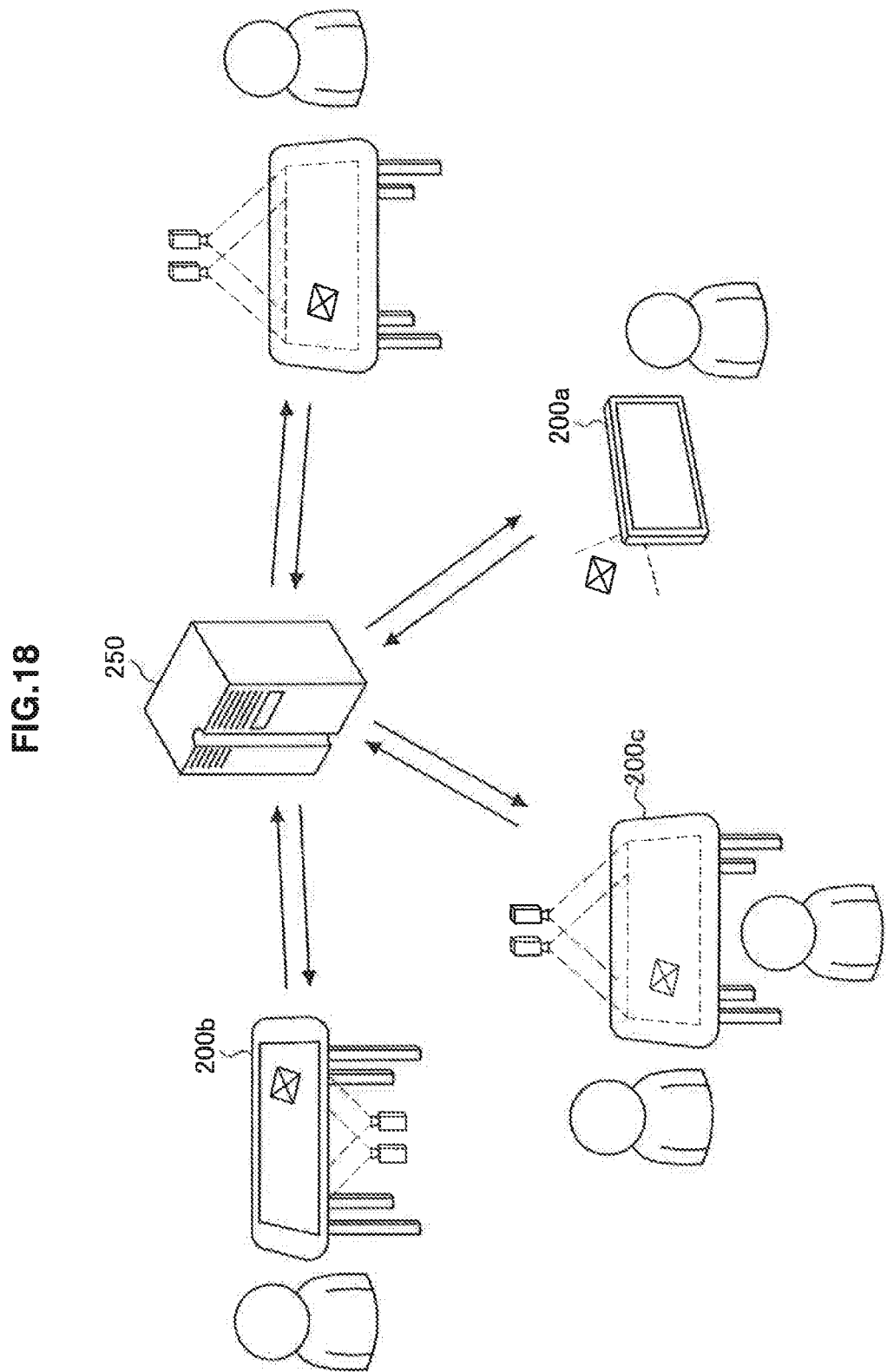
FIG. 18 is a diagram illustrating an example of a use form of terminal devices and a server according to the second embodiment of the present disclosure.

FIG. 18 is a diagram illustrating an example of a use form of terminal devices and a server according to the second embodiment of the present disclosure. Referring to FIG. 18, the server 250 supplies services to the plurality of terminal devices 200. Each terminal device 200 may be used only by a single user or may be commonly used by a plurality of users. The illustrated terminal devices 200a to 200c are the same as the terminal devices 100a to 100c described in the first embodiment. In the server 250, data is stored in the function DB 108 for each terminal device 200 or each user. Each terminal device 200 or each user uses data records generated through registration or use of the terminal device or the user. As another example, as in a third embodiment to be described below, data stored in the function DB 108 of the server 250 may be shared between the users or the terminal devices.

3. Third Embodiment

3-1. Functional Configuration

Figure 19:
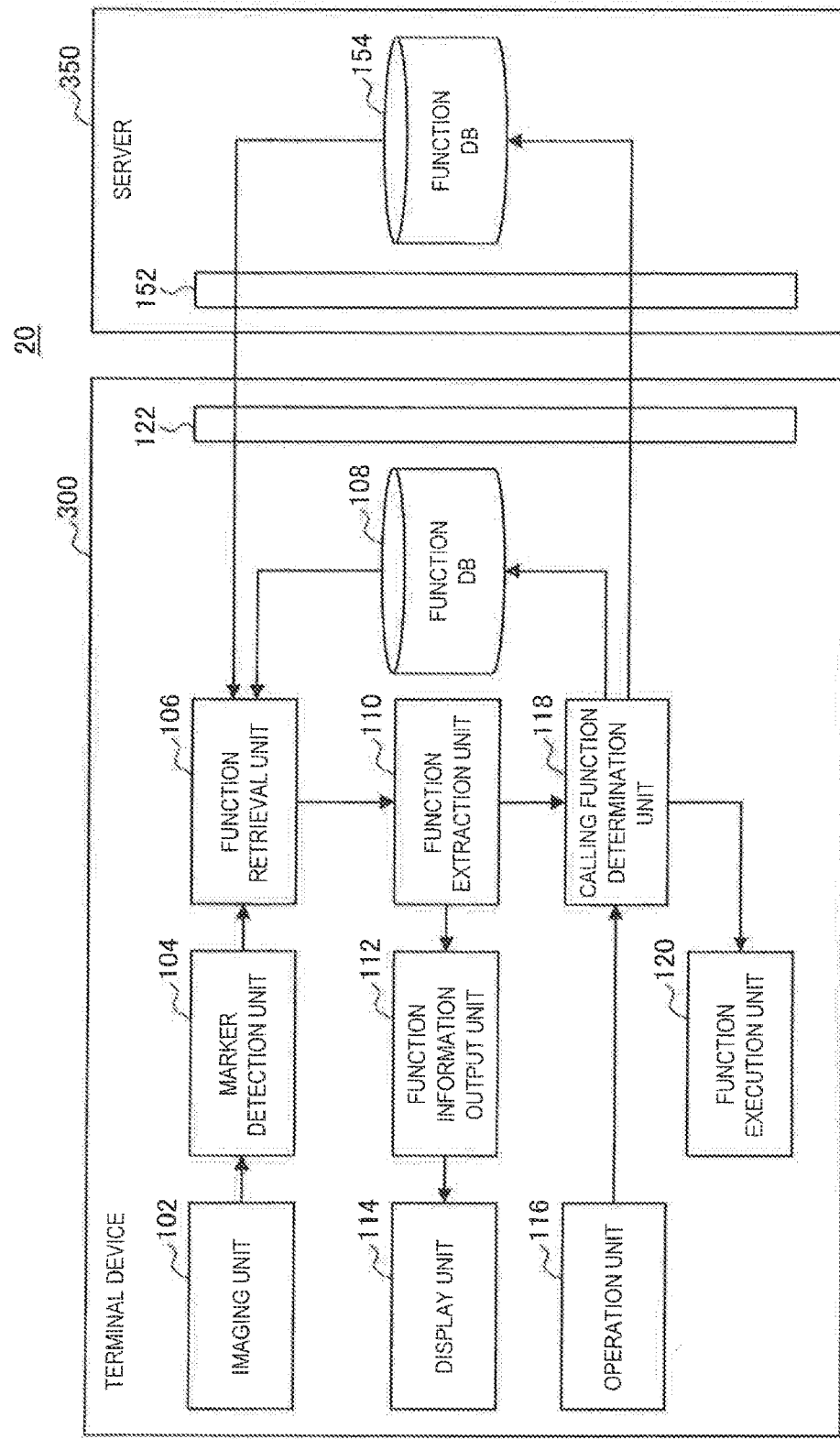
FIG. 19 is a block diagram illustrating an overall functional configuration of a system according to a third embodiment of the present disclosure.

FIG. 19 is a block diagram illustrating an overall functional configuration of a system according to a third embodiment of the present disclosure. Referring to FIG. 19, a system 20 includes a terminal device 300 and a server 350. The terminal device 300 includes an imaging unit 102, a marker detection unit 104, a function retrieval unit 106, a function DB 108, a function extraction unit 110, a function information output unit 112, a display unit 114, an operation unit 116, a calling function determination unit 118, a function execution unit 120, and a communication unit 122. The server 350 includes a communication unit 152 and a function DB 154.

The functions realized by the terminal device 300 are almost the same as those of the foregoing first embodiment. In the embodiment, however, the function retrieval unit 106 retrieves the function DB 154 of the server 350 via the communication unit 122 when information regarding a function corresponding to a marker detected by the marker detection unit 104 is not found in the function DB 108. The function DB 154 stores information regarding functions associated with markers in other terminal devices different from the terminal device 300. When the function corresponding to the marker is found in the function DB 154, the function retrieval unit 106 handles information regarding the found function in the same way as information found in the function DB 108. When information regarding a plurality of functions is found, the function extraction unit 110 and the function information output unit 112 can output information so that the user can select a function.

The calling function determination unit 118 determines to call a function indicated by information retrieved from the function DB 154 of the server 350 by the function retrieval unit 106 or a function selected by the user from the functions. When the calling function determination unit 118 determines a function to be called, the calling function determination unit 118 adds a calling history of the function to the function DB 154 in association with information indicating a marker. In the function DB 154, the data record is not necessarily generated for each added calling history. For example, information regarding the added calling history can be used to update the previously present data records.

In the server 350, the function DB 154 stores information indicating the function previously called in association with the marker by a plurality of terminal devices including the terminal device 300. For example, even when the terminal device 300 does not find the function corresponding to the marker in the function DB 108, there is a probability of the function corresponding to the marker being found by retrieving the calling history of the function in another terminal device stored in the function DB 154 of the server 350. As will be described below, elements of the data record stored in the function DB 154 by the server 350 may be different from elements of the data record stored in the function DB 108 by the terminal device 300.

That is, in the embodiment, the functions of the terminal device 300 include a function common to another terminal device. The data record stored in the function DB 154 of the server 350 includes information generated based on a calling history of a function (the common function between the terminal device 300 and the other terminal device) in which a marker in the other terminal device is used.

The data records in the embodiment include a data record (first data record) stored in the function DB 108 of the terminal device 300 and a data record (second data record) stored in the function DB 154 of the server 350. The function retrieval unit 106 retrieves the second data record when the first data record is not found through the retrieval.

3-2. Example of Data

FIG. 20 is a diagram illustrating examples of data stored in a function DB of a server according to the third embodiment of the present disclosure. Referring to FIG. 20, each data record 1540 stored in the function DB 154 of the server 350 in the embodiment include elements of marker feature amount information, function information, registration date information, a priority flag, and period-of-time information. Hereinafter, each of the elements will be further described.

The marker feature amount is a feature amount extracted from an original image of a marker. Since the data records 1540 are generated based on information regarding the marker registered in the plurality of terminal devices 300, the marker feature amount can be an average value of the feature amounts extracted from the original image (image information) of the marker registered in the plurality of terminal devices 300. Since the data records 1540 are shared between the terminal devices, the original image of the marker which is likely to include private information may not be included in the data records 1540. In the data record 1540, not only is the original image not included, but information indicating private information (for example, individual names or the like written on cards) is also masked and anonymized by averaging the feature amounts, and then the data can be accumulated in this state. That is, in the embodiment, the second data record (stored in the function DB 154 of the server 350) includes the information regarding the marker in a more anonymous form than the first data record (stored in the function DB 108 of the terminal device 300).

The function information is recorded through a function association process in the plurality of terminal devices 300. The actual function information is not necessarily the illustrated readable character string, as in the foregoing example of FIG. 8. In the illustrated example, three functions are associated with a first marker (hospital clinic card) in data records 1540a to 1540c, two functions are associated with a second marker (food packaging) in data records 1540d and 1540e, and three functions are associated with a third marker (separate food packaging) in data records 1540f to 1540h. As shown by the data records 1540b and 1540c, when period-of-time information or the like to be described below is different despite the function being the same, a plurality of data records can be generated.

For example, the registration date information may indicate a date on which the marker is first registered or may indicate a date on which the marker is finally used for the calling of the function.

The priority flag is, for example, a flag intentionally given to specific data by a service manager. For example, the data record 1540d indicates that a campaign application of a food maker is activated by the marker of the food packaging. A service provider sets the priority flag in this data record. That is, the data record is a data record used for an advertisement with which the food maker entrusts the service provider.

The period-of-time information is recorded when a marker is used to call a function in each of the plurality of terminal devices 300. When a plurality of functions are associated with the marker, it can be estimated which function is called by combining the period-of-time information and a current time. As in the example of the data records 1080 of the function DB 108 described above with reference to FIGS. 8A and 8B, the period-of-time information may be recorded only when a result in which the marker is used a predetermined number of times or more or a tendency equal to or greater than predetermined strength is shown in the used period of time (this may be retained separately as information not used to select the function).

3-3. Example of Information Presented to User

FIG. 21 is a diagram illustrating examples of information presented to a user according to the third embodiment of the present disclosure. Referring to FIG. 21, an image 1700 is projected on the table top 125. The image 1700 includes a candidate function image 1720 and a function image 1730.

In the example, the imaging unit 102 of the terminal device 300 captures an image including an object 1710 (food packaging) placed on the table 125. The marker detection unit 104 detects the object 1710 as a marker from the captured image. However, even when the function retrieval unit 106 retrieves the local function DB 108, the data record for which the object 1710 serves as the marker has not been found. Thus, the function retrieval unit 106 further retrieves the function DB 154 of the server 350. Since the data records 1540f to 1540h for which the object 1710 serves as the marker have been found in the function DB 154, the function retrieval unit 106 supplies such information to the function extraction unit 110.

In the illustrated example, since the number of functions which can be presented as the candidate function images 1720 to the user in the image 1700 is 3, all of the three functions included in the found data are extracted as candidates to be presented to the user. Accordingly, the function information output unit 112 presents the candidate function images 1720 indicating the three functions (a recipe retrieval site, a personal communication site, and a product site) shown by the data records 1540f to 1540h to the user in the image 1700. For example, as in the example described above with reference to FIG. 9, the user can call a corresponding function by touching any one of the candidate function images 1720 and display the function image 1730.

3-4. Example of Function Extraction Process

Figure 22:
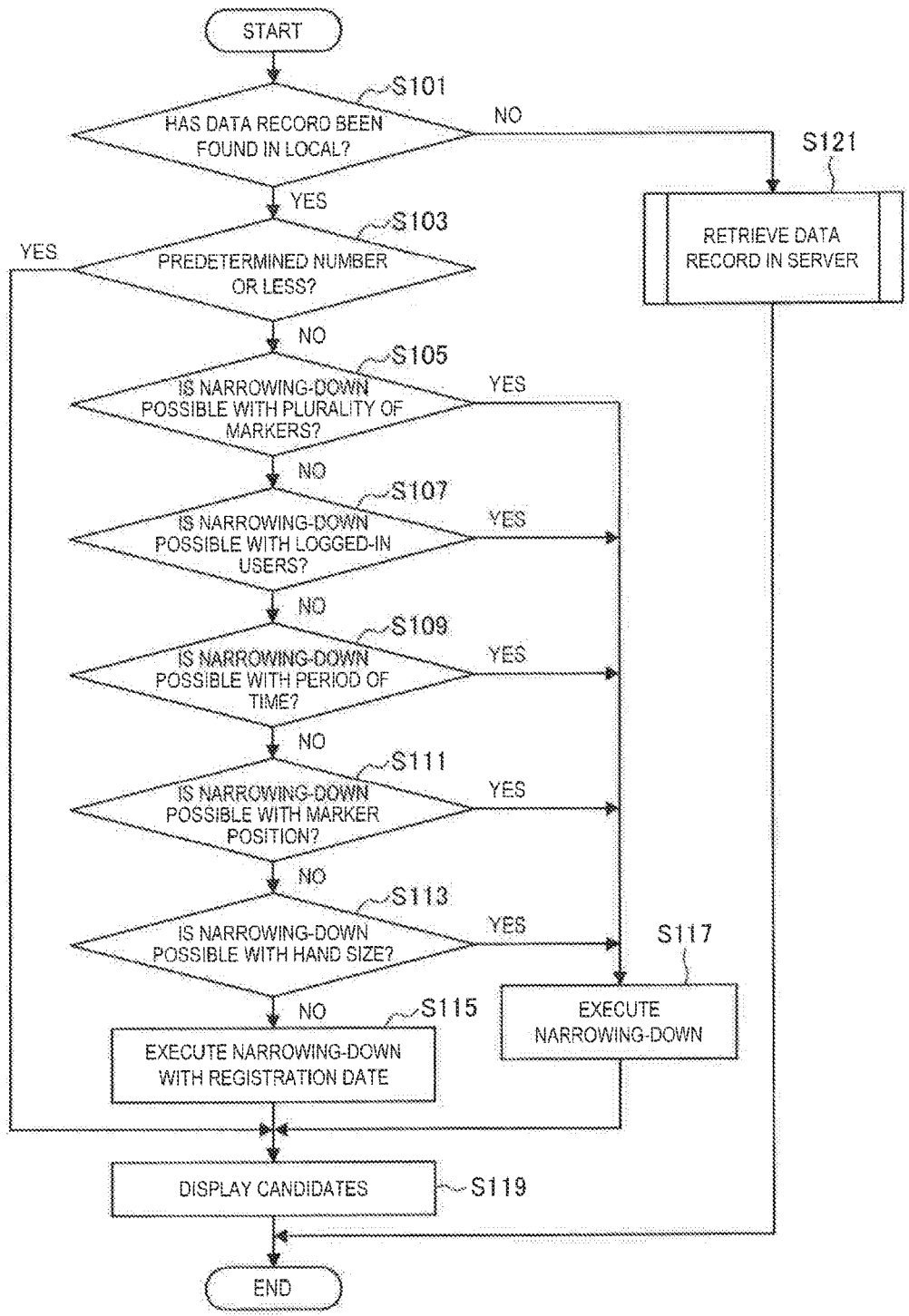
FIG. 22 is a flowchart illustrating an example of a process of extracting local information according to the third embodiment of the present disclosure.

FIG. 22 is a flowchart illustrating an example of a process of extracting local information according to the third embodiment of the present disclosure. In the present specification, information stored in the function DB 108 of the terminal device 300 in the system 20 is also referred to as local information.

As described above, when the imaging unit 102 in the terminal device 300 captures the image and the marker detection unit 104 detects the marker included in the image, the function retrieval unit 106 retrieves the data record in the function DB 108. Here, when the data record for which the functions are associated with the marker has been founded in the local function DB, i.e., the function DB 108 of the terminal device 300 (YES in S101), the function extraction unit 110 determines whether the number of functions indicated by the found data record is equal to or less than a predetermined number (S103). Here, the predetermined number can be, for example, the number of functions which can be displayed as candidate function images in an image displayed by the display unit 114.

When the number of functions is equal to or less than the predetermined number in S103 (YES), the function information output unit 112 causes the display unit 114 to display all of the found functions as candidate functions (S119). Conversely, when the number of found functions exceeds the predetermined number (NO in S103), the functions are narrowed down by the function extraction unit 110.

The function extraction unit 110 first determines whether the functions can be narrowed down to the predetermined number or less using the plurality of markers included in the image (S105). Here, for example, when the plurality of markers are included in the image and the functions associated commonly with each marker is present as in the example described above with reference to FIGS. 13A and 13B, the functions are narrowed down using the fact that there is a high probability of the functions being called. When the narrowing-down is possible (YES in S105), the function extraction unit 110 narrows down the functions (S117) and the function information output unit 112 causes the display unit 114 to display the narrowed-down functions as candidate functions (S119).

Conversely, when the functions may not be narrowed down to the predetermined number or less using the plurality of markers included in the image in S105 (NO), the function extraction unit 110 causes the process to proceed to determination of narrowing-down with a subsequent condition. At this time, except for a case in which the functions may not be narrowed down using the plurality of markers (for example, only a single marker is included in the image or the functions associated with the plurality of markers are not present), the result obtained by narrowing down the functions using the plurality of markers is used in a subsequent process of narrowing down the functions.

As the subsequent condition, the function extraction unit 110 determines whether the functions can be narrowed down to the predetermined number or less based on the logged-in users (S107). Here, for example, when the information regarding the user is included as the use time information in the data of the function DB 108 and the terminal device 300 is used by the logged-in user as in the example described above with reference with FIGS. 8A and 8B, the functions are narrowed down by combing the logged-in users and the users of the use time information. When the functions can be narrowed down (YES in S107), the function extraction unit 110 narrows down the functions (S117) and the function information output unit 112 causes the display unit 114 to display the narrowed-down functions as candidate functions (S119).

When the functions may not be narrowed down to the predetermined number or less based on the logged-in users in S107 (NO), the function extraction unit 110 causes the process to proceed to determination of narrowing-down with another subsequent condition. At this time, except for a case in which the functions may not be narrowed down using the logged-in users (for example, no users log in or the functions associated with specific users are not present), the result obtained by narrowing down the functions using the logged-in users is used in a subsequent process of narrowing down the functions.

Subsequently, it is similarly determined based on the period of time (S109), the marker position (Sill), and the hand size (S113) whether the functions can be narrowed down to the predetermined number or less. Specific examples of such information are described in, for example, FIGS. 8A and 8B, FIGS. 14A and 14B, and FIGS. 15A and 15B. When the functions may not be narrowed down to the predetermined number or less with the previous conditions, determinations are executed with subsequent conditions as in S105 and S107 described above.

When the functions may not be narrowed down to the predetermined number or less based on the hand size in S113 (NO), the function extraction unit 110 narrows down the functions based on the information regarding the registration date included in the data of the function DB 108 (S115). More specifically, the function extraction unit 110 narrows down the registered functions to the predetermined number of functions which can be displayed as candidates, for example, in a new order of the registration date. The function information output unit 112 causes the display unit 114 to display the functions narrowed down to the predetermined number as candidate functions (S119).

Conversely, when the functions associated with the markers are not registered in the local function DB, i.e., the function DB 108 of the terminal device 300, in the determination of S101 (NO in S101), the function retrieval unit 106 retrieves the function information in the function DB 154 of the server 350 (S121). Here, even when the function information is found in the function DB 154, the functions are narrowed down to the predetermined number as in the example described above with reference to S103 to S117. The process of narrowing down the functions at this time will be described below in more detail.

Figure 23:
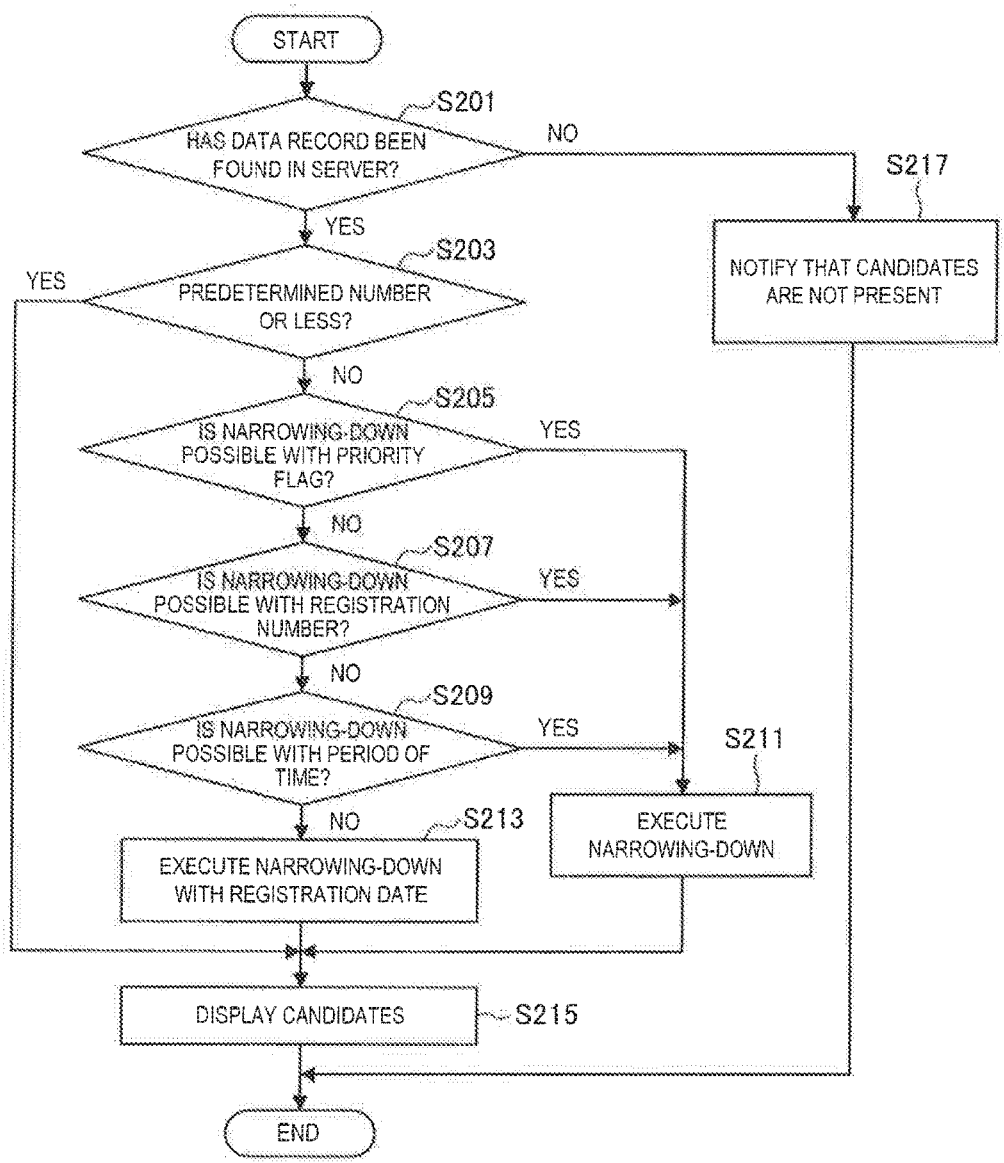
FIG. 23 is a flowchart illustrating an example of a process of extracting server information according to the third embodiment of the present disclosure.

FIG. 23 is a flowchart illustrating an example of a process of extracting server information according to the third embodiment of the present disclosure. In the present specification, information stored in the function DB 154 of the server 350 in the system 20 is also referred to as server information.

When the functions associated with the marker are not found in the function DB 108 of the terminal device 300 in the process described above with reference to FIG. 20, the function retrieval unit 106 retrieves the data record in the function DB 154 of the server 350 via the communication unit 122. Here, when the data record for which the functions are associated with the marker has been found in the function DB 154 of the server 350 (YES in S201), the function extraction unit 110 determines whether the number of functions shown in the found data record is a predetermined number or less (S203). Here, the predetermined number can be, for example, the number of functions which can be displayed as candidate function images in an image displayed by the display unit 114.

When the number of functions is equal to or less than the predetermined number in S203 (YES), the function information output unit 112 causes the display unit 114 to display all of the found functions as candidate functions (S215). Conversely, when the number of found functions exceeds the predetermined number (NO in S203), the function extraction unit 110 narrows down the functions. Since the elements of the data record in the function DB 108 can be different from the elements of the data record in the function DB 154 as in the above-described example, the process of narrowing down the functions can also be different from a process for the local information, as will be described below.

The function extraction unit 110 first determines whether the functions can be narrowed down to the predetermined number or less using the priority flag (S205). Here, for example, when the priority flag is included as the element in the data record stored in the function DB 154 as in the example described above with reference to FIG. 20, information in which the priority flag is set is preferentially extracted as a candidate function. When the functions can be narrowed down (YES in S205), the function extraction unit 110 narrows down the functions (S211) and the function information output unit 112 causes the display unit 114 to display the narrowed-down functions as candidate functions (S215).

Conversely, when the functions may not be narrowed down to the predetermined number or less using the priority flag in S205 (NO), the function extraction unit 110 causes the process to proceed to determination of narrowing-down with a subsequent condition. At this time, except for a case in which the functions may not be narrowed down using the priority flag (for example, the data record in which the priority flag is set is not present), the result obtained by narrowing down the functions using the priority flag is used in a subsequent process of narrowing down the functions.

As the subsequent condition, the function extraction unit 110 determines whether the functions can be narrowed down to the predetermined number or less based on the registration number of data records (S207). Here, the functions are narrowed down based on the registration number of data records in the function DB 154 of the server 350. That is, the function extraction unit 110 extracts the functions associated with the marker in the data record (the number of data records is not necessarily related) including the information generated based on the calling history of the function in which the marker in more terminal devices is used. In the function DB 154, the data record can be registered by calling the function using the marker in the plurality of terminal devices including the terminal device 300. Accordingly, when the combination of the marker and the function for which the registration number is large is used in more terminal devices, a probability of the combination being accepted by the users is estimated to be high. When the functions can be narrowed down, the function extraction unit 110 narrows down the functions (S211) and the function information output unit 112 causes the display unit 114 to display the narrowed-down functions as candidate functions (S215).

Subsequently, it is similarly determined based on the period of time whether the functions can be narrowed down to the predetermined number or less (S209). When the functions may not be narrowed down to the predetermined number or less based on the period of time in S209 (NO), the function extraction unit 110 narrows down the functions based on the information regarding the registration date included in the data of the function DB 154 (S213). More specifically, the function extraction unit 110 narrows down the registered functions to the predetermined number of functions which can be displayed as candidates, for example, in a new order of the registration date. The function information output unit 112 causes the display unit 114 to display the functions narrowed down to the predetermined number as candidate functions (S215).

Conversely, when the functions associated with the marker are not registered even in the function DB 154 of the server 350 in the determination of S201 (NO in S201), the function information output unit 112 causes the display unit 114 to display a notification indicating that the functions are not present as the candidates (S217).

Figure 24:
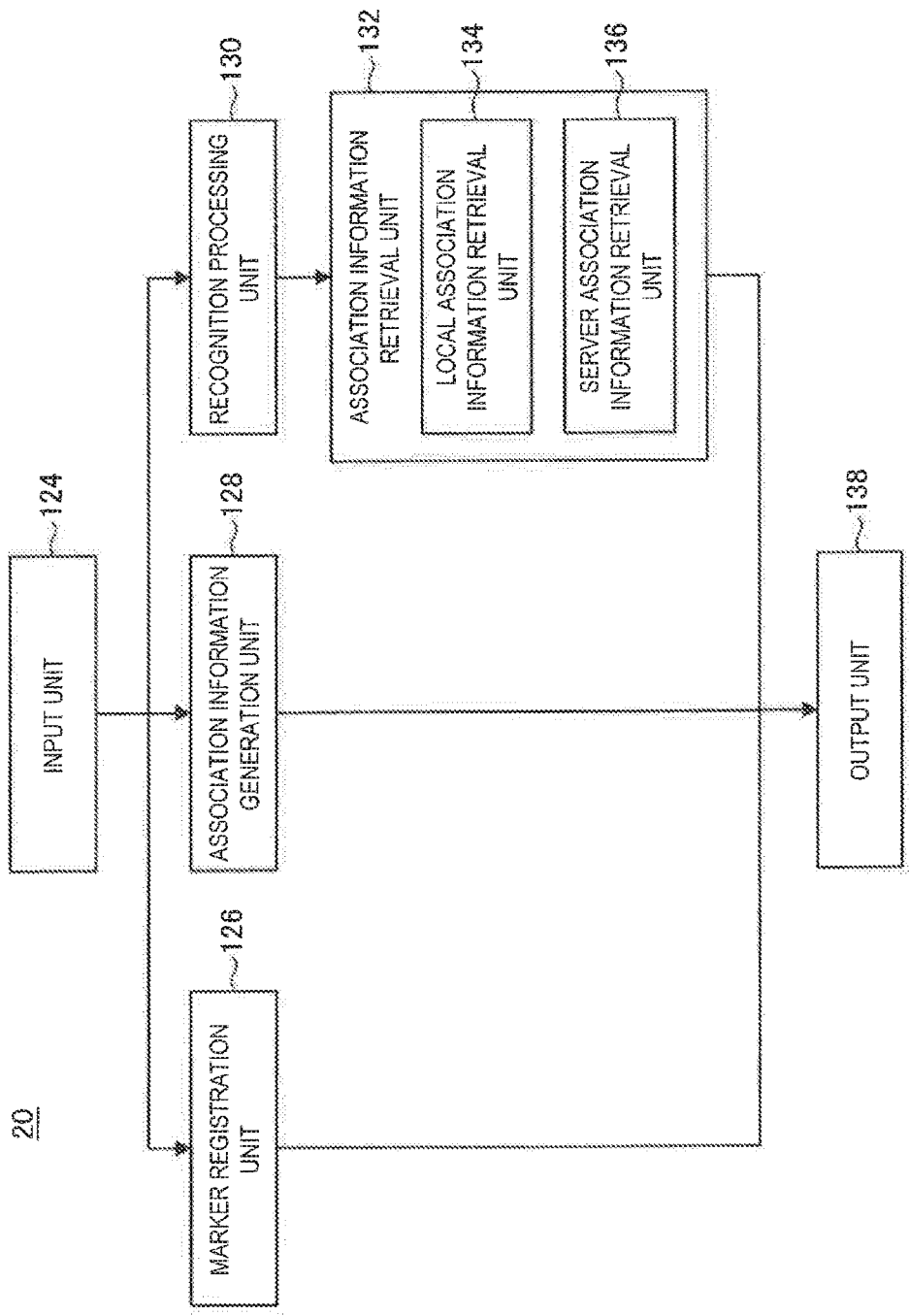
FIG. 24 is a diagram for describing the configuration of a system from another viewpoint according to the third embodiment of the present disclosure.

FIG. 24 is a diagram for describing the configuration of a system according to the third embodiment of the present disclosure from another viewpoint. Referring to FIG. 24, the system 20 includes an input unit 124, a marker registration unit 126, an association information generation unit 128, a recognition processing unit 130, an association information retrieval unit 132, and an output unit 138. The association information retrieval unit 132 includes a local association information retrieval unit 134 and a server association information retrieval unit 136.

The input unit 124 can include an input device such as a touch panel, a keyboard, or a mouse receiving a user's operation as an input. The input unit 124 may include a camera to capture an image including a marker or acquire a user's gesture treated as an input operation.

The marker registration unit 126 acquires information indicating a user's operation or an image captured by a camera from the input unit 124 and registers the marker included in the image based on the information or the captured image.

The association information generation unit 128 acquires information indicating a user's operation from the input unit 124 and generates information associating a function of the terminal device with the marker according to a user's operation.

The recognition processing unit 130 recognizes the marker included in the captured image by extracting a feature amount from the image captured by the camera and acquired from the input unit 124.

The association information retrieval unit 132 retrieves information which indicates a function associated with the feature amount of the marker obtained by the recognition processing unit 130 from a database. The database can be, for example, the database exemplified in FIGS. 8A and 8B or FIG. 20 described above. The association information retrieval unit 132 selects information to be presented to the user via the output unit 138, as necessary.

The local association information retrieval unit 134 in the association information retrieval unit 132 retrieves the association information on the local (terminal device) side. That is, the information retrieved by the local association information retrieval unit 134 can be, for example, information generated based on a calling history of a function in which the marker in the single terminal device is involved.

On the other hand, the server association information retrieval unit 136 in the association information retrieval unit 132 retrieves the association information of the server side. That is, the information retrieved by the server association information retrieval unit 136 can be, for example, information generated based on a calling history of a function in which the marker in each of the plurality of terminal devices is involved.

The output unit 138 can include an output device such as a display or a projector which presents information to a user. The output unit 138 acquires information acquired by the association information retrieval unit 132 and selected as necessary and presents the information to the user.

4. Hardware Configuration

Figure 25:
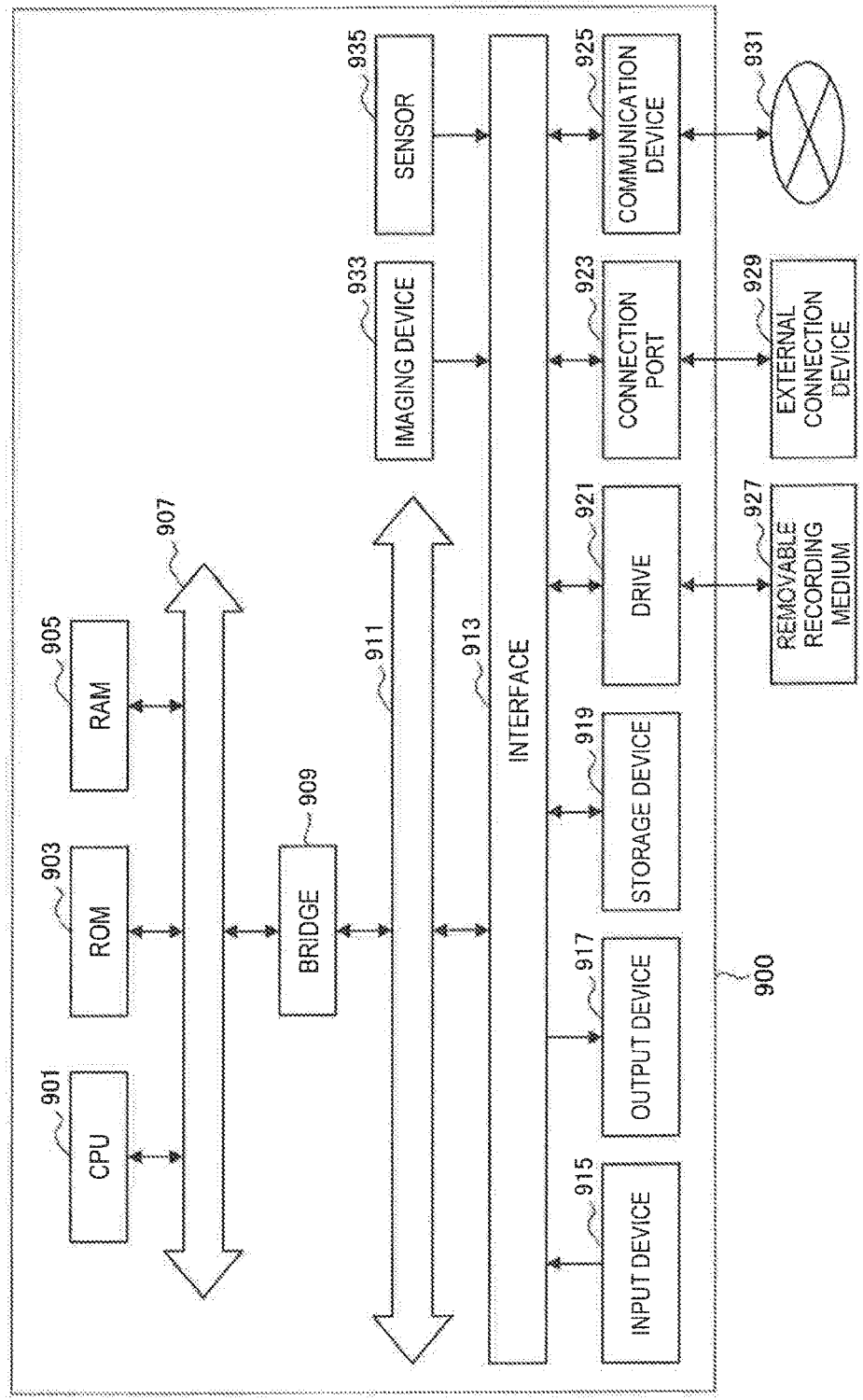
FIG. 25 is a block diagram illustrating an example of a hardware configuration of an information processing device according to an embodiment of the present disclosure.

Next, a hardware configuration of an information processing device according to an embodiment of the present disclosure will be described with reference to FIG. 25. FIG. 25 is a block diagram illustrating an example of the hardware configuration of the information processing device according to the embodiment of the present disclosure. An information processing device 900 illustrated in the drawing can realize, for example, the terminal devices and the server device according to the foregoing embodiments.

The information processing device 900 includes a central processing unit (CPU) 901, a read-only memory (ROM) 903, and a random access memory (RAM) 905. Also, the information processing device 900 may include a host bus 907, a bridge 909, an external bus 911, an interface 913, an input device 915, an output device 917, a storage device 919, a drive 921, a connection port 923, and a communication device 925. The information processing device 900 may further include an imaging device 933 and a sensor 935 as necessary. The information processing device 900 may include a processing circuit called a digital signal processor (DSP) or an application specific integrated circuit (ASIC), instead of or in addition to the CPU 901.

The CPU 901 functions as an arithmetic processing device and a control device and controls all or some of the operations in the information processing device 900 according to various programs recorded in the ROM 903, the RAM 905, the storage device 919, or a removable recording medium 927. The ROM 903 stores a program, an arithmetic parameter, and the like used by the CPU 901. The RAM 905 primarily stores a program used in execution of the CPU 901 and a parameter or the like appropriately changed in execution of the program. The CPU 901, the ROM 903, and the RAM 905 are connected to each other by the host bus 907 including an internal bus such as a CPU bus. Further, the host bus 907 is connected to the external bus 911 such as a Peripheral Component Interconnect/interface (PCI) bus via the bridge 909.

The input device 915 is, for example, an operation unit manipulated by a user, such as a mouse, a keyboard, a touch panel, a button, a switch, and a lever. Also, the input device 915 may be, for example, a remote control device using an infrared ray or other radio waves or may be, for example, an external connection device 929 such as a mobile phone corresponding to a manipulation of the information processing device 900. Also, the input device 915 includes, for example, an input control circuit that generates an input signal based on information input by a user and outputs the signal to the CPU 901. The user inputs various kinds of data to the information processing device 900 or instructs the information processing device 900 to perform a processing operation by manipulating the input device 915. The imaging device 933 to be described below can also function as an input device by imaging a motion or the like of a hand of the user.

The output device 917 includes a device capable of visually or audibly notifying a user of the acquired information. Examples of the output device 917 include display devices such as a liquid crystal display (LCD), a plasma display panel (PDP), and an organic electro-luminescence (EL) display, display devices such as a projector, audio output devices such as a speaker and a headphone, and printer devices. The output device 917 outputs a result obtained through the process of the information processing device 900 as a picture such as text or an image or outputs the result as an audio such as a voice or an acoustic sound.

The storage device 919 is a data storage device configured as an example of the storage unit of the information processing device 900. The storage device 919 includes, for example, a magnetic storage device such as a hard disk device (HDD), a semiconductor storage device, an optical storage device, or a magneto-optical storage device. The storage device 919 stores a program or various kinds of data executed by the CPU 901 and various kinds of data acquired from the outside.

The drive 921 is a reader/writer for the removable recording medium 927 such as a magnetic disk, an optical disc, a magneto-optical disc, or a semiconductor memory, and is built in the information processing device 900 or is attached on the outside thereof. The drive 921 reads information recorded on the mounted removable recording medium 927 and outputs the information to the RAM 905. Also, the drive 921 writes a record on the mounted removable recording medium 927.

The connection port 923 is a port configured to directly connect a device to the information processing device 900. Examples of the connection port 923 include a Universal Serial Bus (USB) port, an IEEE1394 port, and a Small Computer System Interface (SCSI) port. Other examples of the connection port 923 include an RS-232C port, an optical audio terminal, and a High-Definition Multimedia Interface (HDMI) (registered trademark) port. When the external connection device 929 is connected to the connection port 923, various kinds of data can be exchanged between the information processing device 900 and the external connection device 929.

The communication device 925 is, for example, a communication interface including a communication device connected to a communication network 931. Examples of the communication device 925 include communication cards for a wired or wireless Local Area Network (LAN), Bluetooth (registered trademark), and a Wireless USB (WUSB). Also, the communication device 925 may be a router for optical communication, a router for an Asymmetric Digital Subscriber Line (ADSL), or modems for various kinds of communication. For example, the communication device 925 transmits and receives a signal or the like to and from the Internet or another communication device in conformity with a predetermined protocol such as TCP/IP. Also, the communication network 931 connected to the communication device 925 includes networks connected in a wired or wireless manner and includes, for example, the Internet, a household LAN, infrared ray communication, radio-wave communication, or satellite communication.

Examples of the imaging device 933 include an image sensor such as a charge coupled device (CCD) or a complementary metal oxide semiconductor (CMOS) and a device that images an actual space using various members such as lenses controlling formation of an image of a subject in the image sensor and generates a captured image. The imaging device 933 may be a device that captures a still image or may be a device that captures a moving image.

Examples of the sensor 935 include various sensors such as an acceleration sensor, a gyro sensor, a geomagnetic sensor, an optical sensor, or an audio sensor. The sensor 935 acquires, for example, information regarding a posture state of the information processing device 900, such as a posture of the casing of the information processing device 900 or information regarding a surrounding environment of the information processing device 900, such as brightness or noise of the surroundings of the information processing device 900. Also, the sensor 935 may include a Global Positioning System (GPS) sensor that receives GPS signals and measures the latitude, longitude, and altitude of the device.

The example of the hardware configuration of the information processing device 900 has been described above.

Each of the foregoing constituent elements may be configured using a general-purpose member or may be configured by hardware specialized for the function of each constituent element. The configuration can be modified appropriately according to a technical level at the time of realizing the embodiments.

5. Supplement

The embodiments of the present technology can include, for example, the above-described information processing device (a terminal device, a server, or the like), a system, an information processing device, an information processing method performed by the information processing device or the system, a program causing the information processing device to function, and a non-transitory type medium having the program stored therein.

The preferred embodiments of the present disclosure have been described in detail with reference to the appended drawings, but the technical scope of the present disclosure is not limited to the examples. It should be understood by those skilled in the art that various modifications, combinations, sub-combinations and alterations may occur depending on design requirements and other factors insofar as they are within the scope of the appended claims or the equivalents thereof.

The advantageous effects described in the present specification are merely descriptive and exemplary, and thus are not restrictive. That is, according to an embodiment of the technology related to the present disclosure, it is possible to obtain other advantageous effects apparent to those skilled in the art along with the foregoing advantageous effects or instead of the foregoing advantageous effects from the description of the present specification.

Additionally, the present technology may also be configured as below.

(1)
An information processing device including:
 a retrieval unit configured to retrieve a data record in which a marker detected in an image acquired by a terminal device is associated with a function of the terminal device; and
 a calling function determination unit configured to determine the function to be called in the terminal device based on the data record found through the retrieval,
 wherein the data record includes information generated based on a calling history of the function in which the marker in the terminal device is used.
(2)
The information processing device according to (1),
 wherein the function of the terminal device includes a function common to another terminal device, and
 wherein the data record includes information generated based on a calling history of the common function in which the marker in the other terminal device is used.
(3)
The information processing device according to (2),
 wherein the data record includes a first data record including information generated based on the calling history in the terminal device and a second data record including information generated based on the calling history in the other terminal device, and
 wherein the retrieval unit retrieves the second data record when the first data record is not found through the retrieval.
(4)
The information processing device according to (3), wherein the second data record includes information regarding the marker in a more anonymous form than the first data record.
(5)
The information processing device according to (4),
 wherein the first data record includes image information regarding the marker, and
 wherein the second data record includes image feature amount information regarding the marker.
(6)
The information processing device according to any one of (1) to (5), further including:
 a function information output unit configured to output information indicating a function associated with the marker in the data record to a user.
(7)
The information processing device according to (6),
 wherein the function information output unit outputs UI information to receive an input operation of the user instructing to call some or all of functions associated with the marker in the data record, and
 wherein the calling function determination unit determines the function to be called based on the input operation.
(8)
The information processing device according to (6) or (7), wherein the function information output unit continuously outputs the UI information even after the function to be called is determined.
(9)
The information processing device according to any one of (6) to (8),
 wherein the function information output unit outputs information indicating a predetermined number of functions associated with the marker in the data record to the user, and
 wherein the information processing device further includes:
  a function extraction unit configured to extract the predetermined number of functions from functions associated with the marker in the data record when the number of functions indicated in the data record found through the retrieval is greater than the predetermined number.
(10)
The information processing device according to (9),
 wherein the marker includes a first marker and a second marker, and
 wherein the function extraction unit extracts a function associated with both of the first marker and the second marker in the data record.
(11)
The information processing device according to (9) or (10), wherein the function extraction unit extracts a function associated with the marker in the data record including information generated based on the calling history of the function by the user.
(12)
The information processing device according to any one of (9) to (11), wherein the function extraction unit extracts a function associated with the marker in the data record including information generated based on the calling history of the function in a period of time including a current time.
(13)
The information processing device according to any one of (9) to (12), wherein the function extraction unit extracts a function associated with the marker in the data record including information generated based on a calling history of a function in which a marker located at a position identical or close to a position of the marker in the image is used.

(14)

The information processing device according to any one of (9) to (13), wherein the function extraction unit extracts a function associated with the marker in the data record including information generated based on a calling history of a function in which a marker disposed in an image by a hand with a size identical or similar to a size of a hand disposing the marker in the image is used.

(15)

The information processing device according to any one of (1) to (14), wherein the function extraction unit extracts a function associated with the marker in the data record including information generated based on a calling history of a function in which the marker in more terminal devices is used.

(16)

An information processing method including:
 retrieving a data record in which a marker detected in an image acquired by a terminal device is associated with a function of the terminal device; and
 determining the function to be called in the terminal device based on the data record found through the retrieval,
 wherein the data record includes information generated based on a calling history of the function in which the marker in the terminal device is used.

(17)

A program causing a computer to realize:
 a function of retrieving a data record in which a marker detected in an image acquired by a terminal device is associated with a function of the terminal device; and
 a function of determining the function to be called in the terminal device based on the data record found through the retrieval,
 wherein the data record includes information generated based on a calling history of the function in which the marker in the terminal device is used.

What is claimed is:

1. An information processing device comprising:
 circuitry configured to:
  acquire a retrieval result which is generated from a retrieval process based on a data record including information related to a visual feature associated with information indicating a function of a terminal device and information related to an image captured by a capturing device; and
  extract one or more functions from the retrieval result when a number of functions included in the retrieval result is greater than a predetermined number,
 wherein the data record is generated based on a calling history of a function called using information related to the image captured by the capturing device.

2. The information processing device according to claim 1,
 wherein the function of the terminal device includes a function common to another terminal device, and
 wherein the data record includes information generated based on a calling history of the common function in which the marker in the other terminal device is used.

3. The information processing device according to claim 2,
 wherein the data record includes information generated based on the calling history in the terminal device and information generated based on the calling history in the other terminal device, and
 wherein the information generated based on the calling history in the other terminal device is retrieved when the information generated based on the calling history in the terminal device is not found in the retrieval result.

4. The information processing device according to claim 3, wherein the information generated based on the calling history in the other terminal device includes information regarding a marker detected in the captured image in a more anonymous form than the information generated based on the calling history in the terminal device.

5. The information processing device according to claim 4,
 wherein the information generated based on the calling history in the terminal device includes image information regarding the marker, and
 wherein the information generated based on the calling history in the other terminal device includes image feature amount information regarding the marker.

6. The information processing device according to claim 1, wherein the circuitry is further configured to:
 initiate an outputting of information indicating the extracted one or more functions to a user.

7. The information processing device according to claim 6,
 wherein UI information is output to receive an input operation of the user instructing to call one or more of the extracted functions, and
 wherein the one or more of the extracted functions to be called is determined based on the input operation.

8. The information processing device according to claim 7, wherein the UI information is continuously output even after the one or more functions to be called is determined.

9. An information processing device comprising:
 a retrieval unit configured to retrieve a data record in which a marker detected in an image acquired by a terminal device is associated with a function of the terminal device;
 a calling function determination unit configured to determine the function to be called in the terminal device based on the data record found through the retrieval; and
 a function information output unit configured to output information indicating a function associated with the marker in the data record to a user,
 wherein the data record includes information generated based on a calling history of the function in which the marker in the terminal device is used,
 wherein the function information output unit outputs information indicating a predetermined number of functions associated with the marker in the data record to the user,
 wherein the information processing device further comprises:
  a function extraction unit configured to extract the predetermined number of functions from functions associated with the marker in the data record when the number of functions indicated in the data record found through the retrieval is greater than the predetermined number, and
 wherein the retrieval unit, the calling function determination unit, the function information output unit, and the function extraction unit are each implemented via at least one processor.

10. The information processing device according to claim 9, wherein the marker includes a first marker and a second marker, and wherein the function extraction unit extracts a function associated with both of the first marker and the second marker in the data record.

11. The information processing device according to claim 9, wherein the function extraction unit extracts a function associated with the marker in the data record including information generated based on the calling history of the function by the user.

12. The information processing device according to claim 9, wherein the function extraction unit extracts a function associated with the marker in the data record including information generated based on the calling history of the function in a period of time including a current time.

13. The information processing device according to claim 9, wherein the function extraction unit extracts a function associated with the marker in the data record including information generated based on a calling history of a function in which a marker located at a position identical or close to a position of the marker in the image is used.

14. The information processing device according to claim 9, wherein the function extraction unit extracts a function associated with the marker in the data record including information generated based on a calling history of a function in which a marker disposed in an image by a hand with a size identical or similar to a size of a hand disposing the marker in the image is used.

15. The information processing device according to claim 9, wherein the function extraction unit extracts a function associated with the marker in the data record including information generated based on a calling history of a function in which the marker in more terminal devices is used.

16. An information processing method implemented via at least one processor, the method comprising:

acquire a retrieval result which is generated from a retrieval process based on a data record including information related to a visual feature associated with information indicating a function of a terminal device and information related to an image captured by a capturing device; and extract one or more functions from the retrieval result when a number of functions included in the retrieval result is greater than a predetermined number, wherein the data record is generated based on a calling history of a function called using information related to the image captured by the capturing device.

17. A non-transitory computer-readable medium having embodied thereon a program, which when executed by a computer causes the computer to execute a method, the method comprising:

acquire a retrieval result which is generated from a retrieval process based on a data record including information related to a visual feature associated with information indicating a function of a terminal device and information related to an image captured by a capturing device; and extract one or more functions from the retrieval result when a number of functions included in the retrieval result is greater than a predetermined number, wherein the data record is generated based on a calling history of a function called using information related to the image captured by the capturing device.

* * * * *